United States Patent
Schwarm et al.

(10) Patent No.: US 6,999,836 B2
(45) Date of Patent: Feb. 14, 2006

(54) METHOD, SYSTEM, AND MEDIUM FOR HANDLING MISREPRESENTATIVE METROLOGY DATA WITHIN AN ADVANCED PROCESS CONTROL SYSTEM

(75) Inventors: Alexander T. Schwarm, Austin, TX (US); Arulkumar P. Shanmugasundram, Sunnyvale, CA (US); Jacques Seror, Jerusalem (IL); Yuri Kokotov, Maaleh Adumim (IL); Efim Entin, Jerusalem (IL)

(73) Assignee: Applied Materials, Inc., Santa Clara, CA (US)

(*) Notice: Subject to any disclaimer, the term of this patent is extended or adjusted under 35 U.S.C. 154(b) by 5 days.

(21) Appl. No.: 10/632,107

(22) Filed: Aug. 1, 2003

(65) Prior Publication Data

US 2004/0143357 A1 Jul. 22, 2004

Related U.S. Application Data

(60) Provisional application No. 60/399,695, filed on Aug. 1, 2002.

(51) Int. Cl.
 *G06F 19/00* (2006.01)

(52) U.S. Cl. .......................... 700/121; 700/95; 700/45; 438/5; 365/401

(58) Field of Classification Search ................. 700/121, 700/95, 117, 28, 90, 110, 109, 45; 438/5, 438/7, 14; 702/81; 365/401, 399, 400, 604
See application file for complete search history.

(56) References Cited

U.S. PATENT DOCUMENTS 3,205,485 A 9/1965 Noltingk
3,229,198 A 1/1966 Libby (Continued)

FOREIGN PATENT DOCUMENTS

| CA | 2050247 | 8/1991 |
|----|---------|--------|
| CA | 2165847 | 8/1991 |
| CA | 2194855 | 8/1991 |

(Continued)

OTHER PUBLICATIONS

US 6,150,664, 11/2000, Su (withdrawn)
Oct. 1, 2004. International Preliminary Examination Report for PCT Serial No. PCT/US03/23964.

(Continued)

*Primary Examiner*—Kidest Bahta
(74) *Attorney, Agent, or Firm*—Wilmer, Cutler, Pickering, Hale & Dorr

(57) ABSTRACT

A system, method and medium of controlling a semiconductor manufacturing tool using a feedback control mechanism. The feedback control mechanism includes features for receiving data points relating to an output of the tool. The data points include a current data point and at least one previous data point. The feedback control mechanism also includes features for determining whether the current data point is an erroneous outlier by comparing the current data point to a statistical representation of the at least one previous data point, and based on whether the at least one previous data point is an outlier. The feedback control mechanism further includes features for disregarding the current data point in calculating a feedback value of the feedback control mechanism if the current data point is determined as an erroneous outlier.

68 Claims, 11 Drawing Sheets

U.S. PATENT DOCUMENTS

| | | |
|---|---|---|
| 3,767,900 A | 10/1973 | Chao et al. |
| 3,920,965 A | 11/1975 | Sohrwardy |
| 4,000,458 A | 12/1976 | Miller et al. |
| 4,207,520 A | 6/1980 | Flora et al. |
| 4,209,744 A | 6/1980 | Gerasimov et al. |
| 4,302,721 A | 11/1981 | Urbanek et al. |
| 4,368,510 A | 1/1983 | Anderson |
| 4,609,870 A | 9/1986 | Lale et al. |
| 4,616,308 A | 10/1986 | Morshedi et al. |
| 4,663,703 A | 5/1987 | Axelby et al. |
| 4,698,766 A | 10/1987 | Entwistle et al. |
| 4,750,141 A | 6/1988 | Judell et al. |
| 4,755,753 A | 7/1988 | Chern |
| 4,757,259 A | 7/1988 | Charpentier |
| 4,796,194 A | 1/1989 | Atherton |
| 4,901,218 A | 2/1990 | Cornwell |
| 4,938,600 A | 7/1990 | Into |
| 4,957,605 A | 9/1990 | Hurwitt et al. |
| 4,967,381 A | 10/1990 | Lane et al. |
| 5,089,970 A | 2/1992 | Lee et al. |
| 5,108,570 A | 4/1992 | Wang |
| 5,208,765 A | 5/1993 | Turnbull |
| 5,220,517 A | 6/1993 | Sierk et al. |
| 5,226,118 A | 7/1993 | Baker et al. |
| 5,231,585 A | 7/1993 | Kobayashi et al. |
| 5,236,868 A | 8/1993 | Nulman |
| 5,240,552 A | 8/1993 | Yu et al. |
| 5,260,868 A | 11/1993 | Gupta et al. |
| 5,270,222 A | 12/1993 | Moslehi |
| 5,283,141 A | 2/1994 | Yoon et al. |
| 5,295,242 A | 3/1994 | Mashruwala et al. |
| 5,309,221 A | 5/1994 | Fischer et al. |
| 5,329,463 A | 7/1994 | Sierk et al. |
| 5,338,630 A | 8/1994 | Yoon et al. |
| 5,347,446 A | 9/1994 | Iino et al. |
| 5,367,624 A | 11/1994 | Cooper |
| 5,369,544 A | 11/1994 | Mastrangelo |
| 5,375,064 A | 12/1994 | Bollinger |
| 5,398,336 A | 3/1995 | Tantry et al. |
| 5,402,367 A | 3/1995 | Sullivan et al. |
| 5,408,405 A | 4/1995 | Mozumder et al. |
| 5,410,473 A | 4/1995 | Kaneko et al. |
| 5,420,796 A | 5/1995 | Weling et al. |
| 5,427,878 A | 6/1995 | Corliss |
| 5,444,837 A | 8/1995 | Bomans et al. |
| 5,469,361 A | 11/1995 | Moyne |
| 5,485,082 A | 1/1996 | Wisspeintner et al. |
| 5,490,097 A | 2/1996 | Swenson et al. |
| 5,495,417 A | 2/1996 | Fuduka et al. |
| 5,497,316 A | 3/1996 | Sierk et al. |
| 5,497,381 A | 3/1996 | O'Donoghue et al. |
| 5,503,707 A | 4/1996 | Maung et al. |
| 5,508,947 A | 4/1996 | Sierk et al. |
| 5,511,005 A | 4/1996 | Abbe et al. |
| 5,519,605 A | 5/1996 | Cawlfield |
| 5,525,808 A | 6/1996 | Irie et al. |
| 5,526,293 A | 6/1996 | Mozumder et al. |
| 5,534,289 A | 7/1996 | Bilder et al. |
| 5,541,510 A | 7/1996 | Danielson |
| 5,546,312 A | 8/1996 | Mozumder et al. |
| 5,553,195 A | 9/1996 | Meijer |
| 5,586,039 A | 12/1996 | Hirsch et al. |
| 5,599,423 A | 2/1997 | Parker et al. |
| 5,602,492 A | 2/1997 | Cresswell et al. |
| 5,603,707 A | 2/1997 | Trombetta et al. |
| 5,617,023 A | 4/1997 | Skalski |
| 5,627,083 A | 5/1997 | Tounai |
| 5,629,216 A | 5/1997 | Wijaranakula et al. |
| 5,642,296 A | 6/1997 | Saxena |
| 5,646,870 A | 7/1997 | Krivokapic et al. |
| 5,649,169 A | 7/1997 | Berezin et al. |
| 5,654,903 A | 8/1997 | Reitman et al. |
| 5,655,951 A | 8/1997 | Meikle et al. |
| 5,657,254 A | 8/1997 | Sierk et al. |
| 5,661,669 A | 8/1997 | Mozumder et al. |
| 5,663,797 A | 9/1997 | Sandhu |
| 5,664,987 A | 9/1997 | Renteln |
| 5,665,199 A | 9/1997 | Sahota et al. |
| 5,665,214 A | 9/1997 | Iturralde |
| 5,666,297 A | 9/1997 | Britt et al. |
| 5,667,424 A | 9/1997 | Pan |
| 5,674,787 A | 10/1997 | Zhao et al. |
| 5,694,325 A | 12/1997 | Fukuda et al. |
| 5,695,810 A | 12/1997 | Dubin et al. |
| 5,698,989 A | 12/1997 | Nulman |
| 5,719,495 A | 2/1998 | Moslehi |
| 5,719,796 A | 2/1998 | Chen |
| 5,735,055 A | 4/1998 | Hochbein et al. |
| 5,740,429 A | 4/1998 | Wang et al. |
| 5,751,582 A | 5/1998 | Saxena et al. |
| 5,754,297 A | 5/1998 | Nulman |
| 5,761,064 A | 6/1998 | La et al. |
| 5,761,065 A | 6/1998 | Kittler et al. |
| 5,764,543 A | 6/1998 | Kennedy |
| 5,777,901 A | 7/1998 | Berezin et al. |
| 5,787,021 A | 7/1998 | Samaha |
| 5,787,269 A | 7/1998 | Hyodo |
| 5,808,303 A | 9/1998 | Schlagheck et al. |
| 5,812,407 A | 9/1998 | Sato et al. |
| 5,823,854 A | 10/1998 | Chen |
| 5,824,599 A | 10/1998 | Schacham-Diamand et al. |
| 5,825,356 A | 10/1998 | Habib et al. |
| 5,825,913 A | 10/1998 | Rostami et al. |
| 5,828,778 A | 10/1998 | Hagi et al. |
| 5,831,851 A | 11/1998 | Eastburn et al. |
| 5,832,224 A | 11/1998 | Fehskens et al. |
| 5,838,595 A | 11/1998 | Sullivan et al. |
| 5,838,951 A | 11/1998 | Song |
| 5,844,554 A | 12/1998 | Geller et al. |
| 5,857,258 A | 1/1999 | Penzes et al. |
| 5,859,777 A | 1/1999 | Yokoyama et al. |
| 5,859,964 A | 1/1999 | Wang et al. |
| 5,859,975 A | 1/1999 | Brewer et al. |
| 5,862,054 A | 1/1999 | Li |
| 5,863,807 A | 1/1999 | Jang et al. |
| 5,867,389 A | 2/1999 | Hamada et al. |
| 5,870,306 A | 2/1999 | Harada |
| 5,871,805 A | 2/1999 | Lemelson |
| 5,883,437 A | 3/1999 | Maruyama et al. |
| 5,889,991 A | 3/1999 | Consolatti et al. |
| 5,901,313 A | 5/1999 | Wolf et al. |
| 5,903,455 A | 5/1999 | Sharpe, Jr. et al. |
| 5,910,011 A | 6/1999 | Cruse |
| 5,910,846 A | 6/1999 | Sandhu |
| 5,912,678 A | 6/1999 | Saxena et al. |
| 5,916,016 A | 6/1999 | Bothra |
| 5,923,553 A | 7/1999 | Yi |
| 5,926,690 A | 7/1999 | Toprac et al. |
| 5,930,138 A | 7/1999 | Lin et al. |
| 5,940,300 A | 8/1999 | Ozaki |
| 5,943,237 A | 8/1999 | Van Boxem |
| 5,943,550 A | 8/1999 | Fulford, Jr. et al. |
| 5,960,185 A | 9/1999 | Nguyen |
| 5,960,214 A | 9/1999 | Sharpe, Jr. et al. |
| 5,961,369 A | 10/1999 | Bartels et al. |
| 5,963,881 A | 10/1999 | Kahn et al. |
| 5,975,994 A | 11/1999 | Sandhu et al. |
| 5,978,751 A | 11/1999 | Pence et al. |
| 5,982,920 A | 11/1999 | Tobin, Jr. et al. |
| 6,002,989 A | 12/1999 | Shiba et al. |
| 6,012,048 A | 1/2000 | Gustin et al. |

| | | | |
|---|---|---|---|
| 6,017,771 A | 1/2000 | Yang et al. |
| 6,036,349 A | 3/2000 | Gombar |
| 6,037,664 A | 3/2000 | Zhao et al. |
| 6,041,263 A | 3/2000 | Boston et al. |
| 6,041,270 A | 3/2000 | Steffan et al. |
| 6,054,379 A | 4/2000 | Yau et al. |
| 6,059,636 A | 5/2000 | Inaba et al. |
| 6,064,759 A | 5/2000 | Buckley et al. |
| 6,072,313 A | 6/2000 | Li et al. |
| 6,074,443 A | 6/2000 | Venkatesh et al. |
| 6,077,412 A | 6/2000 | Ting et al. |
| 6,078,845 A | 6/2000 | Friedman |
| 6,094,688 A | 7/2000 | Mellen-Garnett et al. |
| 6,096,649 A | 8/2000 | Jang |
| 6,097,887 A | 8/2000 | Hardikar et al. |
| 6,100,195 A | 8/2000 | Chan et al. |
| 6,108,092 A | 8/2000 | Sandhu |
| 6,111,634 A | 8/2000 | Pecen et al. |
| 6,112,130 A | 8/2000 | Fukuda et al. |
| 6,113,462 A | 9/2000 | Yang |
| 6,114,238 A | 9/2000 | Liao |
| 6,127,263 A | 10/2000 | Parikh |
| 6,128,016 A | 10/2000 | Coelho et al. |
| 6,136,163 A | 10/2000 | Cheung et al. |
| 6,141,660 A | 10/2000 | Bach et al. |
| 6,143,646 A | 11/2000 | Wetzel |
| 6,148,099 A | 11/2000 | Lee et al. |
| 6,148,239 A | 11/2000 | Funk et al. |
| 6,148,246 A | 11/2000 | Kawazome |
| 6,150,270 A | 11/2000 | Matsuda et al. |
| 6,157,864 A | 12/2000 | Schwenke et al. |
| 6,159,075 A | 12/2000 | Zhang |
| 6,159,644 A | 12/2000 | Satoh et al. |
| 6,161,054 A | 12/2000 | Rosenthal et al. |
| 6,169,931 B1 | 1/2001 | Runnels |
| 6,172,756 B1 | 1/2001 | Chalmers et al. |
| 6,173,240 B1 | 1/2001 | Sepulveda et al. |
| 6,175,777 B1 | 1/2001 | Kim |
| 6,178,390 B1 | 1/2001 | Jun |
| 6,181,013 B1 | 1/2001 | Liu et al. |
| 6,183,345 B1 | 2/2001 | Kamono et al. |
| 6,185,324 B1 | 2/2001 | Ishihara et al. |
| 6,191,864 B1 | 2/2001 | Sandhu |
| 6,192,291 B1 | 2/2001 | Kwon |
| 6,197,604 B1 | 3/2001 | Miller et al. |
| 6,204,165 B1 | 3/2001 | Ghoshal |
| 6,210,983 B1 | 4/2001 | Atchison et al. |
| 6,211,094 B1 | 4/2001 | Jun et al. |
| 6,212,961 B1 | 4/2001 | Dvir |
| 6,214,734 B1 | 4/2001 | Bothra et al. |
| 6,217,412 B1 | 4/2001 | Campbell et al. |
| 6,219,711 B1 | 4/2001 | Chari |
| 6,222,936 B1 | 4/2001 | Phan et al. |
| 6,226,563 B1 | 5/2001 | Lim |
| 6,226,792 B1 | 5/2001 | Goiffon et al. |
| 6,228,280 B1 | 5/2001 | Li et al. |
| 6,230,069 B1 | 5/2001 | Campbell et al. |
| 6,236,903 B1 | 5/2001 | Kim et al. |
| 6,237,050 B1 | 5/2001 | Kim et al. |
| 6,240,330 B1 | 5/2001 | Kurtzberg et al. |
| 6,240,331 B1 | 5/2001 | Yun |
| 6,245,581 B1 | 6/2001 | Bonser et al. |
| 6,246,972 B1 | 6/2001 | Klimasauskas |
| 6,248,602 B1 | 6/2001 | Bode et al. |
| 6,249,712 B1 | 6/2001 | Boiquaye |
| 6,252,412 B1 | 6/2001 | Talbot et al. |
| 6,253,366 B1 | 6/2001 | Mutschler, III |
| 6,259,160 B1 | 7/2001 | Lopatin et al. |
| 6,263,255 B1 | 7/2001 | Tan et al. |
| 6,268,270 B1 | 7/2001 | Scheid et al. |
| 6,271,670 B1 | 8/2001 | Caffey |
| 6,276,989 B1 | 8/2001 | Campbell et al. |
| 6,277,014 B1 | 8/2001 | Chen et al. |
| 6,278,899 B1 | 8/2001 | Piche et al. |
| 6,280,289 B1 | 8/2001 | Wiswesser et al. |
| 6,281,127 B1 | 8/2001 | Shue |
| 6,284,622 B1 | 9/2001 | Campbell et al. |
| 6,287,879 B1 | 9/2001 | Gonzales et al. |
| 6,290,572 B1 | 9/2001 | Hofmann |
| 6,291,367 B1 | 9/2001 | Kelkar |
| 6,292,708 B1 | 9/2001 | Allen et al. |
| 6,298,274 B1 | 10/2001 | Inoue |
| 6,298,470 B1 | 10/2001 | Breiner et al. |
| 6,303,395 B1 | 10/2001 | Nulman |
| 6,304,999 B1 | 10/2001 | Toprac et al. |
| 6,307,628 B1 | 10/2001 | Lu et al. |
| 6,314,379 B1 | 11/2001 | Hu et al. |
| 6,317,643 B1 | 11/2001 | Dmochowski |
| 6,320,655 B1 | 11/2001 | Matsushita et al. |
| 6,324,481 B1 | 11/2001 | Atchison et al. |
| 6,334,807 B1 | 1/2002 | Lebel et al. |
| 6,336,841 B1 | 1/2002 | Chang |
| 6,339,727 B1 | 1/2002 | Ladd |
| 6,340,602 B1 | 1/2002 | Johnson et al. |
| 6,345,288 B1 | 2/2002 | Reed et al. |
| 6,345,315 B1 | 2/2002 | Mishra |
| 6,346,426 B1 | 2/2002 | Toprac et al. |
| 6,355,559 B1 | 3/2002 | Havemann et al. |
| 6,360,133 B1 | 3/2002 | Campbell et al. |
| 6,360,184 B1 | 3/2002 | Jacquez |
| 6,363,294 B1 | 3/2002 | Coronel et al. |
| 6,366,934 B1 | 4/2002 | Cheng et al. |
| 6,368,879 B1 | 4/2002 | Toprac |
| 6,368,883 B1 | 4/2002 | Bode et al. |
| 6,368,884 B1 | 4/2002 | Goodwin et al. |
| 6,379,980 B1 | 4/2002 | Toprac |
| 6,381,564 B1 | 4/2002 | David et al. |
| 6,388,253 B1 | 5/2002 | Su |
| 6,389,491 B1 | 5/2002 | Jacobson et al. |
| 6,391,780 B1 | 5/2002 | Shih et al. |
| 6,395,152 B1 | 5/2002 | Wang |
| 6,397,114 B1 | 5/2002 | Eryurek et al. |
| 6,400,162 B1 | 6/2002 | Mallory et al. |
| 6,405,096 B1 | 6/2002 | Toprac et al. |
| 6,405,144 B1 | 6/2002 | Toprac et al. |
| 6,417,014 B1 | 7/2002 | Lam et al. |
| 6,427,093 B1 | 7/2002 | Toprac |
| 6,432,728 B1 | 8/2002 | Tai et al. |
| 6,435,952 B1 | 8/2002 | Boyd et al. |
| 6,438,438 B1 | 8/2002 | Takagi et al. |
| 6,440,295 B1 | 8/2002 | Wang |
| 6,442,496 B1 | 8/2002 | Pasadyn et al. |
| 6,449,524 B1 | 9/2002 | Miller et al. |
| 6,455,415 B1 | 9/2002 | Lopatin et al. |
| 6,455,937 B1 | 9/2002 | Cunningham |
| 6,465,263 B1 | 10/2002 | Coss, Jr. et al. |
| 6,470,230 B1 | 10/2002 | Toprac et al. |
| 6,479,902 B1 | 11/2002 | Lopatin et al. |
| 6,479,990 B1 | 11/2002 | Mednikov et al. |
| 6,482,660 B1 | 11/2002 | Conchieri et al. |
| 6,484,064 B1 | 11/2002 | Campbell |
| 6,486,492 B1 | 11/2002 | Su |
| 6,492,281 B1 | 12/2002 | Song et al. |
| 6,495,452 B1 | 12/2002 | Shih |
| 6,503,839 B1 | 1/2003 | Gonzales et al. |
| 6,515,368 B1 | 2/2003 | Lopatin et al. |
| 6,517,413 B1 | 2/2003 | Hu et al. |
| 6,517,414 B1 | 2/2003 | Tobin et al. |
| 6,528,409 B1 | 3/2003 | Lopatin et al. |
| 6,529,789 B1 | 3/2003 | Campbell et al. |
| 6,532,555 B1 | 3/2003 | Miller et al. |
| 6,535,783 B1 | 3/2003 | Miller et al. |

| | | | |
|---|---|---|---|
| 6,537,912 B1 | 3/2003 | Agarwal | |
| 6,540,591 B1 | 4/2003 | Pasadyn et al. | |
| 6,541,401 B1 | 4/2003 | Herner et al. | |
| 6,546,508 B1 | 4/2003 | Sonderman et al. | |
| 6,556,881 B1 | 4/2003 | Miller | |
| 6,560,504 B1 | 5/2003 | Goodwin et al. | |
| 6,563,308 B1 | 5/2003 | Nagano et al. | |
| 6,567,717 B1 | 5/2003 | Krivokapic et al. | |
| 6,580,958 B1 | 6/2003 | Takano | |
| 6,587,744 B1 | 7/2003 | Stoddard et al. | |
| 6,590,179 B1 | 7/2003 | Tanaka et al. | |
| 6,604,012 B1 | 8/2003 | Cho et al. | |
| 6,605,549 B1 | 8/2003 | Leu et al. | |
| 6,607,976 B1 | 8/2003 | Chen et al. | |
| 6,609,946 B1 | 8/2003 | Tran | |
| 6,616,513 B1 | 9/2003 | Osterheld | |
| 6,618,692 B1 | 9/2003 | Takahashi et al. | |
| 6,624,075 B1 | 9/2003 | Lopatin et al. | |
| 6,625,497 B1 | 9/2003 | Fairbairn et al. | |
| 6,630,741 B1 | 10/2003 | Lopatin et al. | |
| 6,640,151 B1 | 10/2003 | Somekh et al. | |
| 6,652,355 B1 | 11/2003 | Wiswesser et al. | |
| 6,660,633 B1 | 12/2003 | Lopatin et al. | |
| 6,678,570 B1 * | 1/2004 | Pasadyn et al. | 700/109 |
| 6,708,074 B1 | 3/2004 | Chi et al. | |
| 6,708,075 B1 | 3/2004 | Sonderman et al. | |
| 6,725,402 B1 | 4/2004 | Coss, Jr. et al. | |
| 6,728,587 B1 | 4/2004 | Goldman et al. | |
| 6,735,492 B1 * | 5/2004 | Conrad et al. | 700/121 |
| 6,751,518 B1 * | 6/2004 | Sonderman et al. | 700/121 |
| 6,774,998 B1 * | 8/2004 | Wright et al. | 356/401 |
| 2001/0001755 A1 | 5/2001 | Sandhu et al. | |
| 2001/0003084 A1 | 6/2001 | Finarov | |
| 2001/0006873 A1 | 7/2001 | Moore | |
| 2001/0030366 A1 | 10/2001 | Nakano et al. | |
| 2001/0039462 A1 | 11/2001 | Mendez et al. | |
| 2001/0040997 A1 | 11/2001 | Tsap et al. | |
| 2001/0042690 A1 | 11/2001 | Talieh | |
| 2001/0044667 A1 | 11/2001 | Nakano et al. | |
| 2002/0032499 A1 | 3/2002 | Wilson et al. | |
| 2002/0058460 A1 | 5/2002 | Lee et al. | |
| 2002/0070126 A1 | 6/2002 | Sato et al. | |
| 2002/0077031 A1 | 6/2002 | Johannson et al. | |
| 2002/0081951 A1 | 6/2002 | Boyd et al. | |
| 2002/0089676 A1 | 7/2002 | Pecen et al. | |
| 2002/0102853 A1 | 8/2002 | Li et al. | |
| 2002/0107599 A1 | 8/2002 | Patel et al. | |
| 2002/0107604 A1 | 8/2002 | Riley et al. | |
| 2002/0113039 A1 | 8/2002 | Mok et al. | |
| 2002/0127950 A1 | 9/2002 | Hirose et al. | |
| 2002/0128805 A1 | 9/2002 | Goldman et al. | |
| 2002/0149359 A1 | 10/2002 | Crouzen et al. | |
| 2002/0165636 A1 | 11/2002 | Hasan | |
| 2002/0183986 A1 | 12/2002 | Stewart et al. | |
| 2002/0185658 A1 | 12/2002 | Inoue et al. | |
| 2002/0193899 A1 | 12/2002 | Shanmugasundram et al. | |
| 2002/0193902 A1 | 12/2002 | Shanmugasundram et al. | |
| 2002/0197745 A1 | 12/2002 | Shanmugasundram et al. | |
| 2002/0197934 A1 | 12/2002 | Paik | |
| 2002/0199082 A1 | 12/2002 | Shanmugasundram et al. | |
| 2003/0017256 A1 | 1/2003 | Shimane | |
| 2003/0020909 A1 | 1/2003 | Adams et al. | |
| 2003/0020928 A1 | 1/2003 | Ritzdorf et al. | |
| 2003/0154062 A1 | 8/2003 | Daft et al. | |

FOREIGN PATENT DOCUMENTS

| | | |
|---|---|---|
| EP | 0 397 924 A1 | 11/1990 |
| EP | 0 621 522 A2 | 10/1994 |
| EP | 0 747 795 A2 | 12/1996 |
| EP | 0 869 652 A2 | 10/1998 |
| EP | 0 877 308 A2 | 11/1998 |
| EP | 0 881 040 A2 | 12/1998 |
| EP | 0 895 145 A1 | 2/1999 |
| EP | 0 910 123 A1 | 4/1999 |
| EP | 0 932 194 A1 | 7/1999 |
| EP | 0 932 195 A1 | 7/1999 |
| EP | 1 066 925 A2 | 1/2001 |
| EP | 1 067 757 A1 | 1/2001 |
| EP | 1 071 128 A2 | 1/2001 |
| EP | 1 083 470 A2 | 3/2001 |
| EP | 1 092 505 A2 | 4/2001 |
| EP | 1 072 967 A3 | 11/2001 |
| EP | 1 182 526 A2 | 2/2002 |
| GB | 2 347 885 A | 9/2000 |
| GB | 2 365 215 A | 2/2002 |
| JP | 61-66104 | 4/1986 |
| JP | 61-171147 | 8/1986 |
| JP | 01-283934 | 11/1989 |
| JP | 3-202710 | 9/1991 |
| JP | 05-151231 | 6/1993 |
| JP | 05-216896 | 8/1993 |
| JP | 05-266029 | 10/1993 |
| JP | 06-110894 | 4/1994 |
| JP | 06-176994 | 6/1994 |
| JP | 06-184434 | 7/1994 |
| JP | 06-252236 | 9/1994 |
| JP | 06-260380 | 9/1994 |
| JP | 8-23166 | 1/1996 |
| JP | 08-50161 | 2/1996 |
| JP | 08-149583 | 6/1996 |
| JP | 08-304023 | 11/1996 |
| JP | 09-34535 | 2/1997 |
| JP | 9-246547 | 9/1997 |
| JP | 10-34522 | 2/1998 |
| JP | 10-173029 | 6/1998 |
| JP | 11-67853 | 3/1999 |
| JP | 11-126816 | 5/1999 |
| JP | 11-135601 | 5/1999 |
| JP | 2000-183001 | 6/2000 |
| JP | 2001-76982 | 3/2001 |
| JP | 2001-284299 | 10/2001 |
| JP | 2001-305108 | 10/2001 |
| JP | 2002-9030 | 1/2002 |
| JP | 2002-343754 | 11/2002 |
| TW | 434103 | 5/2001 |
| TW | 436383 B | 5/2001 |
| TW | 455938 B | 9/2001 |
| TW | 455976 | 9/2001 |
| WO | WO 95/34866 | 12/1995 |
| WO | WO 98/05066 | 2/1998 |
| WO | WO 98/45090 | 10/1998 |
| WO | WO 99/09371 | 2/1999 |
| WO | WO 99/25520 | 5/1999 |
| WO | WO 99/59200 | 11/1999 |
| WO | WO 00/00874 | 1/2000 |
| WO | WO 00/05759 | 2/2000 |
| WO | WO 00/35063 | 6/2000 |
| WO | WO 00/54325 | 9/2000 |
| WO | WO 00/79355 A1 | 12/2000 |
| WO | WO 01/11679 A1 | 2/2001 |
| WO | WO 01/15865 A1 | 3/2001 |
| WO | WO 01/18623 A1 | 3/2001 |
| WO | WO 01/25865 A1 | 4/2001 |
| WO | WO 01/33277 A1 | 5/2001 |
| WO | WO 01/33501 A1 | 5/2001 |
| WO | WO 01/52055 A3 | 7/2001 |
| WO | WO 01/52319 A1 | 7/2001 |
| WO | WO 01/57823 A2 | 8/2001 |
| WO | WO 01/80306 A2 | 10/2001 |
| WO | WO 02/17150 A1 | 2/2002 |
| WO | WO 02/31613 A3 | 4/2002 |
| WO | WO 02/31613 A2 | 4/2002 |

| | | |
|---|---|---|
| WO | WO 02/33737 A2 | 4/2002 |
| WO | WO 02/074491 A1 | 9/2002 |

OTHER PUBLICATIONS

Sep. 29, 2004, Office Action for U.S. Appl. No. 09/363,966, filed Jul. 29, 1999.

Oct. 6, 2004. Office Action for U.S. Appl. No. 10/759,108, filed Jan. 20, 2004.

Oct. 12, 2004. International Preliminary Examination Report for PCT Serial No. PCT/US02/19061.

Nov. 17, 2004. Written Opinion for PCT Serial No. PCT/US01/27407.

IslamRaja, M. M., C. Chang, J. P. McVittie, M. A. Cappelli, and K. C. Saraswat. May/Jun. 1993. "Two Precursor Model for Low–Pressure Chemical Vapor Deposition of Silicon Dioxide from Tetraethylorthosilicate." *J. Vac. Sci. Technol. B*, vol. 11, No. 3, pp. 720–726.

Kim, Eui Jung and William N. Gill. Jul. 1994. "Analytical Model for Chemical Vapor Deposition of $SiO_2$ Films Using Tetraethoxysiliane and Ozone"(Abstract). *Journal of Crystal Growth*, vol. 140, Issues 3–4, pp. 315–326.

Guo, R.S, A. Chen, C.L. Tseng, I.K. Fong, A. Yang, C.L. Lee, C.H. Wu, S. Lin, S.J. Huang, Y.C. Lee, S.G. Chang, and M.Y. Lee. Jun. 16–17, 1998. "A Real–Time Equipment Monitoring and Fault Detection System." *Semiconductor Manufacturing Technoogy Workshop*, pp. 111–121.

Lantz, Mikkel. 1999. "Equipment and APC Integration at AMD with Workstream." *IEEE*, pp. 325–327.

Jul. 15, 2004. Office Action for U.S. Appl. No. 10/172,977, filed Jun. 18, 2002.

Aug. 2, 2003. Office Action for U.S. Appl. No. 10/174,377, filed Jun. 18, 2002.

Aug. 9, 2004. Written Opinion for PCT Serial No. PCT/US02/19063.

August 18, 2004. International Preliminary Examination Report for PCT Serial No. PCT/US02/19116.

Aug. 24, 2004. Office Action for U.S. Appl. No. 10/135,405, filed May 1, 2002.

Aug. 25, 2004. Office Action for U.S. Appl. No. 09/998,384, filed Nov. 30, 2001.

Sep. 9, 2004. Written Opinion for PCT Serial No. PCT/US02/21942.

Sep. 16, 2004. International Preliminary Examination Report for PCT Serial No. PCT/US02/24859.

Sun, S.C. 1998. "CVD and PVD Transition Metal Nitrides as Diffusion Barriers for Cu Metallization. " *IEEE*. pp. 243–246.

Tagami, M., A. Furuya, T. Onodera, and Y. Hayashi. 1999. "Layered Ta–nitrides (LTN) Barrier Film by Power Swing Sputtering (PSS) Technique for MOCVD–Cu Damascene Interconnects." *IEEE*, pp. 635–638.

Yamagishi, H., Z. Tokei, G.P. Beyer, R. Donaton, H. Bender, T. Nogami, and K. Maex. 2000. "TEM/SEM Investigation and Electrical Evaluation of a Bottomless I–PVD TA(N) Barrier in Dual Damascene" (Abstract). *Advanced Metallization Conference 2000*. San Diego, CA.

Eisenbraun, Eric, Oscar van der Straten, Yu Zhu, Katharine Dovidenko, and Alain Kaloyeros. 2001. "Atomic Layer Deposition (ALD) of Tantalum–Based Materials for Zero Thickness Copper Barrier Applications" (Abstract). *IEEE*. pp. 207–209.

Smith. S.R., K.E. Elers, T. Jacobs, V. Blaschke, and K. Pfeifer. 2001. "Physical and Electrical Characterization of ALD Tin Used as a Copper Diffusion Barrier in 0.25 mum, Dual Damascene Backend Structures" (Abstract). *Advanced Metallization Conference 2001*. Montreal, Quebec.

Kim, Y.T. and H. Sim. 2002. "Characteristics of Pulse Plasma Enhanced Atomic Layer Deposition of Tungsten Nitride Diffusion Barrier for Copper Interconnect" (Abstract). *IEIC Technical Report*. vol. 102, No. 178, pp. 115–118.

Elers, Kai–Erik, Ville Saanila, Pekka, J. Soininen, Wei–Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). *Advanced Materials*. vol. 14, No. 13–14, pp. 149–153.

Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual Damascene Technology with ALD TaN Barrier." *IEEE*. pp. 603–606.

Van der Straten, O., Y. Zhu, E. Eisenbraun, and A. Kaloyeros. 2002. "Thermal and Electrical Barrier Performance Testing of Ultrathin Atomic Layer Deposition Tantalum–Based Materials for Nanoscale Copper Metallization." *IEEE*. pp. 188–190.

Wu, Z.C., Y.C. Lu, C.C. Chiang, M.C. Chen, B.T. Chen. G.J. Wang, Y.T. Chen. J.L. Huang, S.M. Jang, and M.S. Liang. 2002. "Advanced Metal Barrier Free Cu Damascene Interconnects with PECVD Silicon Carbide Barriers for 90/65–nm BEOL Technology." *IEEE*. pp. 595–598.

Jul. 25, 2003. International Search Report for PCT/US02/24858.

Mar. 30, 2004. Written Opinion for PCT/US02/19602.

Apr. 9, 2004. Written Opinion for PCT/US02/19116.

Apr. 22, 2004. Office Action for U.S. Appl. No. 09/998,372, filed Nov. 30, 2001.

Apr. 28, 2004. Written Opinion for PCT/US02/19117.

Apr. 29, 2004. Written Opinion for PCT/US02/19061.

May 5, 2004. Office Action for U.S. Appl. No. 09/943,955, filed Aug. 31, 2001.

May 5, 2004. International Preliminary Examination Report for PCT/US01/27406.

May 28, 2004. Office Action for U.S. Appl. No. 09/943,383, filed Aug. 31, 2001.

Jun. 3, 2004. Office Action for U.S. Appl. No. 09/928/474, filed Aug. 14, 2001.

Jun. 23, 2004. Office Action for U.S. Appl. No. 10/686,589, filed Oct. 17, 2003.

Jun. 30, 2004. Office Action for U.S. Appl. No. 09/800,980, filed Mar. 8, 2001.

Jul. 12, 2004. Office Action for U.S. Appl. No. 10/173,108, filed Jun. 8, 2001.

Yeh, C. Eugene, John C. Cheng, and Kwan Wong. 1993. "Implementation Challenges of a Feedback Control System for Wafer Fabrication." *IEEE/CHMT International Electronics Manufacturing Technology Symposium*, pp. 438–442.

Fan, Jr–Min, Ruey–Shan Guo, Shi–Chung Chang, and Kian– Huei Lee. 1996. "Abnormal Trend Detection of Sequence– Disordered Data Using EWMA Method." *IEEE/SEMI Advanced Semiconductor Manufacturing Conference*, pp. 169–174.

Smith, Taber and Duane Boning. 1996. "A Self–Tuning EWMA Controller Utilizing Artificial Neural Network Function Approximation Techniques." *IEEE/CMPT International Electronics Manufacturing Technology Symposium,* pp. 355–363.

Guo, Ruey–Shan, Li–Shia Huang, Argon Chen, and Jin–Jung Chen. Oct. 1997. "A Cost–Effective Methodology for a Run–by–Run EWMA Controller." *6th International Symposium on Semiconductor Manufacturing,* pp. 61–64.

Nov. 1999. "How to Use EWMA to Achieve SPC and EPC Control." *International Symposium on NDT Contribution to the Infrastructure Safety Systems,* Tores, Brazil. <http://www.ndt.net/abstract/ndtiss99/data/35.htm>.

Chen, Argon and Ruey–Shan Guo. Feb. 2001. "Age–Based Double EWMA Controller and Its Application to CMP Processes." *IEEE Transactions on Semiconductor Manufacturing,* vol. 14, No. 1, pp. 11–19.

Wang, LiRen and Hefin Rowlands. 2001. "A Novel NN–Fuzzy–SPC Feedback Control System." *8th IEEE International Conference on Emerging Technologies and Factory Automationa,* pp. 417–423.

Good, Richard and S. Joe Qin. May 2002. "Stability Analysis of Double EWMA Run–to–Run Control with Metrology Delay." *IEEE/CPMT International Electronics Manufacturing Technology Symposium,* pp. 355–363.

Dec. 16, 2003. International Search Report for PCT/US03/23964.

U.S. Appl. No. 09/363,966, filed Jul. 29, 1999, Arackaparambil et al., Computer Integrated Manufacturing Techniques.

U.S. Appl. No. 09/469,227, filed Dec. 22, 1999, Somekh et al., Multi–Tool Control System, Method and Medium.

U.S. Appl. No. 09/619,044, filed Jul. 19, 2000, Yuan, System and Method of Exporting or Importing Object Data in a Manufacturing Execution System.

U.S. Appl. No. 09/637,620, filed Aug. 11, 2000, Chi et al., Generic Interface Builder.

U.S. Appl. No. 09/656,031, filed Sep. 6, 2000, Chi et al., Dispatching Component for Associating Manufacturing Facility Service Requestors with Service Providers.

U.S. Appl. No. 09/655,542, filed Sep. 6, 2000, Yuan, System, Method and Medium for Defining Palettes to Transform an Application Program Interface for a Service.

U.S. Appl. No. 09/725,908, filed Nov. 30, 2000, Chi et al., Dynamic Subject Information Generation in Message Services of Distributed Object Systems.

U.S. Appl. No. 09/800,980, filed Mar. 8, 2001, Hawkins et al., Dynamic and Extensible Task Guide.

U.S. Appl. No. 09/811,667, filed Mar. 20, 2001, Yuan et al., Fault Tolerant and Automated Computer Software Workflow.

U.S. Appl. No. 09/927,444, filed Aug. 13, 2001, Ward et al., Dynamic Control of Wafer Processing Paths in Semiconductor Manufacturing Processes.

U.S. Appl. No. 09/928,473, filed Aug. 14, 2001, Koh, Tool Services Layer for Providing Tool Service Functions in Conjunction with Tool Functions.

U.S. Appl. No. 09/928,474, filed Aug. 14, 2001, Krishnamurthy et al., Experiment Management System, Method and Medium.

U.S. Appl. No. 09/943,383, filed Aug. 31, 2001, Shanmugasundram et al., In Situ Sensor Based Control of Semiconductor Processing Procedure.

U.S. Appl. No. 09/943,955, filed Aug. 31, 2001, Sanmugasundram et al., Feedback Control of a Chemical Mechanical Polishing Device Providing Manipulation of Removal Rate Profiles.

U.S. Appl. No. 09/998,372, filed Nov. 30, 2001, Paik, Control of Chemical Mechanical Polishing Pad Conditioner Directional Velocity to Improve Pad Life.

U.S. Appl. No. 09/998,384, filed Nov. 30, 2001, Paik, Feedfowrard and Feedback Control for Conditioning of Chemical Mechanical Polishing Pad.

U.S. Appl. No. 10/084,092, filed Feb. 28, 2002, Arackaparambil et al., Computer Integrated Manufacturing Techniques.

U.S. Appl. No. 10/100,184, filed Mar. 19, 2002, Al–Bayati et al. Method, System and Medium for Controlling Semiconductor Wafer Processes Using Critical Dimension Measurements.

U.S. Appl. No. 10/135,405, filed May 1, 2002, Reiss et al., Integration of Fault Detection with Run–to–Run Control.

U.S. Appl. No. 10/135,451, filed May 1, 2002, Shanmugasundram et al., Dynamic Metrology Schemes and Sampling Schemes for Advanced Process Control in Semiconductor Processing.

U.S. Appl. No. 10/172,977, filed Jun. 18, 2002, Shanmugasundram et al. Method, System and Medium for Process Control for the Matching of Tools, Chambers and/or Other Semiconductor–Related Entities.

U.S. Appl. No. 10/173,108, filed Jun. 18, 2002, Shanmugasundram et al., Integrating Tool, Module, and Fab Level Control.

U.S. Appl. No. 10/174,370, filed Jun. 18, 2002, Shanmugasundram et al., Feedback Control of Plasma–Enhanced Chemical Vapor Depostion Processes.

U.S. Appl. No. 10/174,377, filed Jun. 18, 2002, Schwarm et al., Feedback Control of Sub–Atomospheric Chemical Vapor Deposition Processes.

U.S. Appl. No. 10/377,654, filed Mar. 4, 2003, Kokotov et al., Method, System and Medium for Controlling Manufacturing Process Using Adaptive Models Based on Empirical Data.

U.S. Appl. No. 10/339,531, Mar. 21, 2003, filed Shanmugasundram et al., Copper Wiring Module Control.

Miller, G. L., D. A. H. Robinson, and J. D. Wiley. Jul. 1976. "Contactless measurement of semiconductor conductivity by radio frequency–free–carrier power absorption." *Rev. Sci. Instrum.,* vol. 47, No. 7. pp. 799–805.

Ostanin, Yu. Ya. Oct. 1981. "Optimization of Thickness Inspection of Electrically Conductive Single–Layer Coatings with Laid–on–Eddy–Current Transducers (Abstract)." *Defektoskopiya,* vol. 17, No. 10, pp. 45–52. Moscow, USSR.

Feb. 1984. "Method and Apparatus of in Situ Measurement and Overlay Error Analysis for Correcting Step and Repeat Lithographic Cameras." *IBM Technical Disclosure Bulletin,* pp. 4855–4859.

Feb. 1984. "Substrate Screening Process." *IBM Technical Disclosure Bulletin,* pp. 4824–4825.

Oct. 1984. "Method to Characterize the Stability of a Step and Repeat Lithographic System." *IBM Technical Disclosure Bulletin,* pp. 2857–2860.

Levine, Martin D. 1985. *Vision in Man and Machine.* New York: McGraw–Hill, Inc. pp. ix–xii, 1–58.

Herrmann, D. 1988. "Temperature Errors and Ways of Elimination for Contactless Measurement of Shaft Vibrations (Abstract)." *TechnisesMessen™*, vol. 55, No. 1, pp. 27–30. West Germany.

Lin, Kuang–Kuo and Costas J. Spanos. Nov. 1990. "Statistical Equipment Modeling for VLSI Manufacturing: An Application of LPCVD." *IEEE Transactions on Semiconductor Manufacturing*, v. 3, n. 4, pp. 216–229.

Runyan, W. R., and K. E. Bean. 1990. "Semiconductor Integrated Circuit Processing Technology." p. 48. Reading, Massachusetts: Addison–Wesley Publishing Company.

Chang, Norman H. and Costas J. Spanos. Feb. 1991. "Continuous Equipment Diagnosis Using Evidence Integration: An LPCVD Application." *IEEE Transactions on Semiconductor Manufacturing*, v. 4, n. 1, pp. 43–51.

Larrabee, G. B. May 1991. "The Intelligent Microelectronics Factory of the Future (Abstract)." *IEEE/SEMI International Semiconductor Manufacturing Science Symposium*, pp. 30–34, Burlingame, CA.

Burke, Peter A. Jun. 1991. "Semi–Empirical Modelling of $SiO_2$ Chemical–Mechanical Polishing Planarization." *VMIC Conference, 1991 IEEE*, pp. 379–384. IEEE.

Zorich, Robert. 1991. *Handbook of Quality Integrated Circuit Manufacturing*. pp. 464–498 San Diego, California: Academic Press, Inc.

Rampalli, Prasad, Arakere Ramesch, and Nimish Shah. 1991. *CEPT—A Computer–Aided Manufacturing Application for Managing Equipment Reliability and Availability in the Semiconductor Industry*. New York, New York: IEEE.

May 1992. "Laser Ablation Endpoint Detector." *IBM Technical Disclosure Bulletin*, pp. 333–334.

Spanos, Costas J., Hai–Fang Guo, Alan Miller, and Joanne Levine–Parrill. Nov. 1992. "Real–Time Statistical Process Control Using Tool Data." *IEEE Transactions on Semiconductor Manufacturing*, v. 5, n. 4, pp. 308–318.

Feb. 1993. "Electroless Plating Scheme to Hermetically Seal Copper Features." *IBM Technical Disclosure Bulletin*, pp. 405–406.

Scarr, J. M. and J. K. Zelisse. Apr. 1993. "New Topology for Thickness Monitoring Eddy Current Sensors (Abstract)." *Proceedings of the 36th Annual Technical Conference*, Dallas, Texas.

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126–132.

Matsuyama, Akira and Jessi Niou. 1993. "A State–of–the–Art Automation System of an ASIC Wafer Fab in Japan." *IEEE/SEMI International Semiconductor Manufacturing Science Symposium*, pp. 42–47.

Kurtzberg, Jerome M. and Menachem Levanoni. Jan. 1994. "ABC: A Better Control for Manufacturing." *IBM Journal of Research and Development*, v. 38, n. 1, pp. 11–30.

Mozumder, Purnendu K. and Gabriel G. Barna. Feb. 1994. "Statistical Feedback Control of a Plasma Etch Process." *IEEE Transactions on Semiconductor Manufacturing*, v. 7, n. 1, pp. 1–11.

Muller–Heinzerling. Thomas, Ulrich Neu, Hans Georg Nurnberg, and Wolfgang May. Mar. 1994. "Recipe–Controlled Operation of Batch Processes with Batch X." *ATP Automatisierungstechnische Praxis*, vol. 36, No. 3, pp. 43–51.

Stoddard, K., P. Crouch, M. Kozicki, and K. Tsakalis. Jun.–Jul. 1994. "Application of Feedforward and Adaptive Feedback Control to Semiconductor Device Manufacturing (Abstract)." *Proceedings of 1994 American Control Conference—ACC'94*, vol. 1, pp. 892–896. Baltimore, Maryland.

Rocha, Joao and Carlos Ramos. Sep. 12, 1994. "Task Planning for Flexible and Agile Manufacturing Systems." *Intelligent Robots and Systems '94. Advanced Robotic Systems, and the Real World, IROS '94. Proceedings of the IEEE/RSJ/GI International Conference on Munich, Germany Sep. 12–16, 1994*. New York, New York:IEEE, pp. 105–112.

Schaper, C. D., M. M. Moslehi, K. C. Saraswat, and T. Kailath. Nov. 1994. "Modeling, Identification, and Control of Rapid Thermal Processing Systems, (Abstract)." *Journal of the Electrochemical Society*, vol. 141, No. 11, pp. 3200–3209.

Tao, K. M., R. L. Kosut, M. Ekblad, and G. Aral. Dec. 1994. "Feedforward Learning Applied to RTP of Semiconductor Wafers (Abstract)." *Proceedings of the 33rd IEEE Conference on Decision and Control*, vol. 1, pp. 67–72. Lake Buena Vista, Florida.

Hu, Albert, He Du, Steve Wong, Peter Renteln, and Emmanuel Sachs. 1994. "Application of Run by Run Controller to the Chemical–Mechanical Planarization Process." *IEEE/CPMT International Electronics Manufacturing Technology Symposium*, pp. 371–378.

Spanos, C. J., S. Leang, S.–Y. Ma, J. Thomson, B. Bombay, and X. Niu. May 1995. "A Multistep Supervisory Controller for Photolithographic Operations (Abstract)." *Proceedings of the Symposium on Process Control, Diagnostics, and Modeling in Semiconductor Manufacturing*, pp. 3–17.

Moyne, James, Roland Telfeyan, Arnon Hurwitz, and John Taylor. Aug. 1995. "A Process–Independent Run–to–Run Controller and Its Application to Chemical–Mechanical Planarization." *SEMI/IEEE Advanced Semiconductor Manufacturing Conference and Workshop*. Ann Arbor, Michigan: The University of Michigan, Electrical Engineering & Computer Science Center for Display Technology & Manufacturing.

Zhou, Zhen–Hong and Rafael Reif. Aug. 1995. "Epi–Film Thickness Measurements Using Emission Fourier Transform Infrared Spectroscopy—Part II: Real–Time *in Situ* Process Monitoring and Control." IEEE Transactions on Semiconductor Manufacturing, vol. 8, No. 3.

Telfeyan, Roland, James Moyne, Nauman Chaudhry, James Pugmire, Scott Shellman, Duane Boning William Moyne, Aron Hurwitz, and John Taylor. Oct. 1995. "A Multi–Level Approach to the Control of a Chemical–Mechanical Planarization Process." Minneapolis, Minnesota: 42nd National Symposium of the American Vacuum Society.

Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systematic and Random Sources of Die– and Wafer–level ILD Thickness Variation in CMP Processes." Washington, D.C.: International Electron Devices Meeting.

Moyne, James R., Nauman Chaudhry, and Roland Telfeyan. 1995. "Adaptive Extensions to a Multi–Branch Run–to–Run Controller for Plasma Etching." *Journal of Vacuum Science and Technology*. Ann Arbor, Michigan: University of Michigan Display Technology Manufacturing Center.

Schmid, Hans Albrecht. 1995. "Creating the Architecture of a Manufacturing Framework by Design Patterns." Austin, Texas: OOPSLA.

Dishon, G., M. Finarov, R. Kipper, J.W. Curry, T. Schraub, D. Trojan, 4th Stambaugh, Y. Li and J. Ben–Jacob. Feb. 1996. "On–Line Integrated Metrology for CMP Processing." *Santa Clara, California: VMIC Speciality Conferences, 1st International CMP Planarization Conference.*

Leang, Sovarong, Shang–Yi Ma, John Thomson, Bart John Bombay, and Costas J. Spanos. May 1996. "A Control System for Photolithographic Sequences." *IEEE Transactions on Semiconductor Manufacturing,* vol. 9, No. 2.

Smith, Taber, Duane Boning, James Moyne, Arnon Hurwitz, and John Curry. Jun. 1996. "Compensating for CMP Pad Wear Using Run by Run Feedback Control." Santa Clara, California: Proceedings of the Thirteenth International VLSI Multilevel Interconnection Conference, pp. 437–439.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical–Mechanical Polishing." *IEEE Transactions on Components, Packaging, and Manufacturing Technology—Part C,* vol. 19, No. 4, pp. 307–314.

Zhe, Ning, J. R. Moyen, T. Smith, D. Boning, E. Del Castillo, Yeh Jinn–Yi, and Hurwitz. Nov. 1996. "a Comparative Analysis of Run–to–Run Control Algorithms in Semiconductor Manufacturing Industry (Abstract)." *IEEE/SEMI 1996 Advanced Semiconductor Manufacturing Conference Workshop,* pp. 375–381.

Yasuda, M., T. Osaka, and M. Ikeda. Dec. 1996. "Feedforward Control of a Vibration Isolation System for Disturbance Suppression (Abstract)." *Proceeding of the 35th IEEE Conference on Decision and Control,* vol. 2, pp. 1229–1233. Kobe, Japan.

SEMI. [1986] 1996. "Standard for Definition and Measurement of Equipment Reliability, Availability, and Maintainability (RAM). " SEMI E10–96.

Mullins, J. A., W. J. Campbell, and A. D. Stock. Oct. 1997. "An Evaluation of Model Predictive Control in Run–to–Run Processing in Semiconductor Manufacturing (Abstract)." *Proceedings of the SPIE—The International Society for Optical Engineering Conference,* vol. 3213, pp. 182–189.

Reitman, E. A., D. J. Friedman, and E. R. Lory. Nov. 1997. "Pre–Production Results Demonstrating Multiple–System Models for Yield Analysis (Abstract)." *IEEE Transactions on Semiconductor Manufacturing,* vol. 10, No. 4, pp. 469–481.

Durham, Jim and Myriam Roussel. 1997, "A Statistical Method for Correlating In–Line Defectivity to Probe Yield." *IEEE/SEMI Advanced Semiconductor Manufacturing Conference,* pp. 76–77.

Shindo, Wataru, Eric H. Wang, Ram Akella, and Andrzej J. Strojwas. 1997. "Excursion Detection and Source Isolation in Defect Inspection and Classification." *2nd International Workshop on Statistical Metrology,* pp. 90–93.

Van Zant, Peter. 1997. *Microchip Fabrication: A Practical Guide To Semiconductor Processing.* Third Edition. pp. 472–478. New York, New York: McGraw–Hill.

Campbell, W. Jarrett, and Anthony J. Toprac. Feb. 11–12, 1998. "Run–to–Run Control in Microelectronics Manufacturing." Advanced Micro Devises, TWMCC.

Edgar, Thomas F., Stephanie W. Butler, Jarrett Campbell, Carlos Pfeiffer, Chris Bode, Sung Bo Hwang, and K.S. Balakrishnan. May 1998. "Automatic Control in Microelectronics Manufacturing: Practices, Challenges, and Possibilities." Automatica, vol. 36, pp. 1567–1603, 2000.

Moyne, James, and John Curry. Jun. 1998. "A Fully Automated Chemical–Mechanical Planarization Process." Santa Clara, California: VLSI Multilevel Interconnection (V–MIC) Conference.

Jul. 1998. "Active Controller: Utilizing Active Databases for Implementing Multistep Control of Semiconductor Manufacturing (Abstract)." *IEEE Transactions on Components, Packaging and Manufacturing Technology—Part C,* vol. 21, No. 3, pp. 217–224.

SEMI. Jul. 1998. *New Standard: Provisional Specification for CIM Framework Domain Architecture.* Mountain View, California: SEMI Standards. SEMI Draft Doc. 2817.

Consilium. Aug. 1998. *Quality Management Component: QMC™ and QMC–Link™ Overview.* Mountain View, California: Consilium, Inc.

Chemali, Chadi El, James Moyne, Kareemullah Khan, Rock Nadeau, Paul Smith, John Colt, Jonathan Chapple–Sokol, and Tarun Parikh. Nov. 1998. "Multizone Uniformity Control of a CMP Process Utilizing a Pre and Post–Measurement Strategy." Seattle, Washington: SEMETECH Symposium.

Consilium. 1998. *FAB300™.* Mountain View, California: Consilium, Inc.

Fang, S. J., A. Barda, T. Janecko, W. Little, D. Outley, G. Hempel, S. Joshi, B. Morrison, G. B. Shinn, and M. Birang. 1998. "Control of Dielectric Chemical Mechanical Polishing (CMP) Using and Interferometry Based Endpoint Sensor." *International Proceedings of the IEEE Interconnect Technology Conference,* pp. 76–78.

Khan, Kareemullah, Victor Solakhain, Anthony Ricci, Tier Gu, and James Moyne. 1998. "Run–to–Run Control of ITO Deposition Process." Ann Arbor, Michigan.

Ouma, Dennis, Duane Boning, James Chung, Greg Shinn, Leif Olsen, and John Clard. 1998. "An Integrated Characterization and Modeling Methodology for CMP Dielectric Planarization." *Proceedings of the IEEE 1998 International Interconnect Technology Conference,* pp. 67–69.

Suzuki, Junichi and Yoshikazu Yamamoto. 1998. "Toward the Interoperable Software Design Models: Quartet of UML, XML, DOM and CORBA." Proceedings IEEE International Software Engineering Standards Symposium. pp. 1–10.

Consilium. Jan. 1999. "FAB300™: Consilium's Next Generation MES Solution of Software and Services which Control and Automate Real–Time FAB Operations." www.consilium.com/products/fab300_page.htm#FAB300 Introduction.

Boning, Duane S., Jerry Stefani, and Stephanie W. Butler. Feb. 1999. "Statistical Methods for Semiconductor Manufacturing." *Encyclopedia of Electrical Engineering. J. G. Webster, Ed.*

McIntosh, John. Mar. 1999. "Using CD–SEM Metrology in the Manufacture of Semiconductors (Abstract)." *JOM,* vol. 51, No. 3, pp. 38–39.

Pan, J. Tony, Ping Li, Kapila Wijekoon, Stan Tsai, and Fritz Redeker. May 1999. "Copper CMP Integration and Time Dependent Pattern Effect." *IEEE 1999 International Interconnect Technology Conference,* pp. 164–166.

Klein, Bruce. Jun. 1999. "Application Development: XML Makes Object Models More Useful." Informationweek. pp. 1A–6A.

Baliga, John. Jul. 1999. "Advanced Process Control: Soon to be a Must." Cahners Semiconductor International. www.semiconductor.net/semiconductor/issues/issues/1999/jul99/docs/feature1.asp.

Consilium. Jul. 1999. "Increasing Overall Equipment Effectiveness (OEE) in Fab Manufacturing by Implementing Consilium's Next–Generation Manufacturing Execution System—MES II." Semiconductor Fabtech Edition 10.

Meckl, P. H. and K. Umemoto. Aug. 1999. "Achieving Fast Motions in Semiconductor Manufacturing Machinery (Abstract)." *Proceedings of the 1999 IEEE International Conference on Control Applications,* vol. 1, pp. 725–729. Kohala Cost, HI.

Consilium Corporate Brochure. Oct. 1999. www.consilium.com.

Khan, K., C. El Chemali, J. Moyne, J. Chapple–Sokol, R. Nadeau, P. Smith, C., and T. Parikh. Oct. 1999. "Yield Improvement at the Contact Process Through Run–to–Run Control (Abstract)." *24$^{th}$ IEEE/CPMT Electronics Manufacturing Technology Symposium,* pp. 258–263.

Moyne, James. Oct. 1999. "Advancements in CMP Process Automation and Control." Hawaii: (Invited paper and presentation to) Third International Symposium on Chemical Mechanical Polishing in IC Device Manufacturing: 196$^{th}$ Meeting of the Electrochemical Society.

Williams, Randy, Dadi Gudmundsson, Kevin Monahan, Raman Nurani, Meryl Stoller and J. George Shanthikumar. Oct. 1999. "Optimized Sample Planning for Wafer Defect Inspection," *Semiconductor Manufacturing Conference Proceedings, 1999 IEEE International Symposium on Santa Clara, CA.* Piscataway, NJ. pp. 43–46.

Consilium. Nov. 1999. *FAB300™ Update.*

Ruegsegger, Steven, Aaron Wagner, James S. Freudenberg, and Dennis S. Grimard. Nov. 1999. "Feedforward Control for Reduced Run–to–Run Variation in Microelectronics Manufacturing." *IEEE Transactions on Semiconductor Manufacturing,* vol. 12, No. 4.

1999. "Contactless Bulk Resistivity/Sheet Resistance Measurement and Mapping Systems." www.Leighton.com/fabtech/index.html.

Edgar, T. F., W. J. Campbell, and C. Bode. Dec. 1999. "Model–Based–Control in Microelectronics Manufacturing." *Proceedings of the 38$^{th}$ IEEE Conference on Decision and Control,* Phoenix, Arizona, vol. 4, pp. 4185–4191.

Meckl, P. H. and K. Umemoto. Apr. 2000. "Achieving Fast Motions by Using Shaped Reference Inputs [Semiconductor Manufacturing Machine] (Abstract)." *NEC Research and Development,* vol. 41, No. 2, pp. 232–237.

Chemali, Chadi El, James Moyne, Kareemullah Khan, Rock Nadeau, Paul Smith, John Colt, Jonathan Chapple–Sokol, and Tarun Parikh. Jul./Aug. 2000. "Multizone Uniformity Control of a Chemical Mechanical Polishing Process Utilizing a Pre– and Postmeasurement Strategy." J. Vac. Sci. Technol. A, vol. 18(4). pp. 1287–1296. American Vacuum Society.

Oechsner, R., T. Tschaftary, S. Sommer. L. Pfitzner, H. Ryssel, H. Gerath, C. Baier, and M. Hafner. Sep. 2000. "Feed–forward Control for a Lithography/Etch Sequence (Abstract)." *Proceedings of the SPIE—The International Society for Optical Engineering Conference,* vol. 4182, pp. 31–39.

Cheung, Robin. Oct. 18, 2000. "Copper Interconnect Technology." *AVS/CMP User Group Meeting,* Santa Clara, CA.

Edgar, Thomas F., Stephanie W. Butler, W. Jarrett Campbell, Carols Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." *Automatica,* v. 36, n. 11.

Khan, S., M. Musavi, and H. Ressom. Nov. 2000. "Critical Dimension Control in Semiconductor Manufacturing (Abstract)." *ANNIE 2000. Smart Engineering Systems Design Conference,* pp. 995–1000. St. Louis, Missouri.

ACM Research Inc. 2000. "Advanced Copper Metallization for 0.13 to 0.05 μm & Beyond." <http://acmrc.com/press/ACM–ECP–brochure.pdf>.

Ravid, Avi, Avner Sharon, Amit Weingarten, Vladimir Machavariani, and David Scheiner. 2000. "Copper CMP Planarity Control Using ITM." *IEEE/SEMI Advanced Semiconductor Manufacturing Conference,* pp. 437–443.

SEMI. 2000. "Provisional Specification for CIM Framework Scheduling Component." San Jose, California. SEMI E105–1000.

2000. "Microsense II Capacitance Gaging System." www.a-detech.com.

Mar. 5, 2001. "KLA–Tencor Introduces First Production–worthy Copper CMP In–situ Film Thickness and End– point Control System." http://www.kla–tencor.com/j/servlet/NewsItem?newsItemID=74.

Lee, Brian, Duane S. Boning, Winthrop Baylies, Noel Poduje, Pat Hester, Yong Xia, Jon Valley, Chris Koliopoulus Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

Tobin, K. W., T. P. Karnowski, L. F. Arrowood, and F. Lakhani. Apr. 2001. "Field Test Results of an Automated Image Retrieval System (Abstract)." *Advanced Semiconductor Manufacturing Conference, 2001 IEEE/SEMI,* Munich, Germany.

Tan. K. K., H. F. Dou, and K. Z. Tang. May–Jun. 2001. "Precision Motion Control System for Ultra–Precision Semiconductor and Electronic Components Manufacturing (Abstract)." *51$^{st}$ Electronic Components and Technology Conference 2001. Proceedings,* pp. 1372–1379. Orlando, Florida.

Jensen, Alan, Peter Renteln, Stephen Jew, Chris Raeder, and Patrick Cheung. Jun. 2001. "Empirical–Based Modeling for Control of CMP Removal Uniformity." Solid State Technology, vol. 44, No. 6, pp. 101–102, 104, 106. Cowan Publ. Corp.: Washington, D.C.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07shtml.

Heuberger, U. Sep. 2001. "Coating Thickness Measurment with Dual–Function Eddy–Current & Magnetic Inductance Instrument (Abstract)." *Galvanotechnik,* vol. 92, No. 9, pp. 2354–2366+IV.

Pilu, Maruizio. Sep. 2001. "Undoing Page Curl Distortion Using Applicable Surfaces." *IEEE International Conference on Image Processing.* Thessalonica, Greece.

Oct. 15, 2001. Search Report prepared by the Austrian Patent Office for Singapore Patent Application No. 200004286–1.

NovaScan 2020. Feb. 2002. "Superior Integrated Process Control for Emerging CMP High–End Applications".

Mar. 15, 2002. Office Action for U.S. Appl. No. 09/469,227, filed Dec. 22, 1999.

Mar. 29, 2002. Office Action for U.S. Appl. No. 09/363,966, filed Jul. 29, 1999.

Moyne, J., V. Solakhian, A. Yershov, M. Anderson, and D. Mockler–Hebert. Apr.–May 2002. "Development and Deployment of a Multi–Component Advanced Process Control System for an Epitaxy Tool (Abstract)." *2002 IEEE Advanced Semiconductor Manufacturing Conference and Workshop,* pp. 1125–130.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh. Apr. May 2002. "Advance Process Control Solutions for Semiconductor Manufacturing." Boston, Massachusetts: *13th Annual IEEE/SEMI Advanced Semiconductor Manufacturing Conference. Advancing the Science and Technology of Semiconductor Manufacturing, ASMC 2002,* pp. 101–106.

Campbell, W. J., S. K. Firth, A. J. Toprac, and T. F. Edgar. May 2002. "A Comparison of Run–to–Run Control Algorithms (Abstract)." *Proceedings of 2002 American Control Conference,* vol. 3, pp. 2150–2155.

Smith, Stewart, Anthony J. Walton, Alan W. S. Ross, George K. H. Bodammer, and J. T. M. Stevenson. May 2002. "Evaluation of Sheet Resistance and Electrical Linewidth Measurement Techniques for Copper Damascene Interconnect." *IEEE Transactions on Semiconductor Manufacturing,* vol. 15, No. 2, pp. 214–222.

Johnson, Bob. Jun. 10, 2002. "Advanced Process Control Key to Moore's Law." Gartner, Inc.

Jun. 20, 2002. Office Action for U.S. Appl. No. 09/619,044, filed Jul. 19, 2000.

Itabashi, Takeyuki, Hiroshi Nakano, and Haruo Akahoshi. Jun. 2002. "Electroless Deposited CoWB for Copper Diffusion Barrier Metal." *IEEE International Interconnect Technology Conference,* pp. 285–287.

Jul. 9, 2002. International Search Report for PCT/US01/24910.

Jul. 23, 2002. Communication Pursuant to Article 96(2) EPC for European Patent Application No. 00 115 577.9.

Jul. 29, 2002. International Search Report for PCT/US01/27407.

Sep. 26, 2002. Office Action for U.S. Appl. No. 09/637,620, filed Aug. 11, 2000.

Oct. 4, 2002. International Search Report for PCT/US01/22833.

Oct. 15, 2002. International Search Report for PCT/US02/19062.

Oct. 23, 2002. International Search Report for PCT/US01/27406.

Oct. 23, 2002. Office Action for U.S. Appl. No. 09/469,227, filed Dec. 22, 1999.

Nov. 7, 2002. International Search Report for PCT/US02/19061.

Nov. 11, 2002. International Search Report for PCT/US02/19117.

Nov. 12, 2002. International Search Report for PCT/US02/19063.

Dec. 17, 2002. Office Action for U.S. Appl. No. 09/363,966, filed Jul. 29, 1999.

ACM Research, Inc. 2002. "ACM Ultra ECP® System: Electro–Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper¯electrochemical_plating.html.

KLA–Tencor Corporation. 2002. "KLA Tencor: Press Release: KLA–Tencor Introduces Frist Production–Worthy Copper CMP In–Site Film Thickness and End–point Control System: Multi–Million Dollar Order Shipped to Major CMP Tool Manufacturer." www.kla–tencor.com/news_events/press_releases/press_releases 2001/984086002.html. Sonderman, Thomas. 2002. "APC as a Competitive Manufacturing Technology: *AMD's Vision for 300mm.*" AEC/APC.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogam. 2002. "Fragile Porous Low–k/Copper Integration by Using Electro–Chemical Polishing." *2002 Symposium on VLSI Technology Digest of Technical Papers,* pp. 32–33.

2002. "Microsense II—5810: Non–Contact Capacitance Gaging Module." www.adetech.com.

Feb. 10, 2003. Office Action for U.S. Appl. No. 09/619,044, filed Jul. 19, 2000.

Mar. 25, 2003. International Search Report for PCT/US02/24859.

Apr. 9, 2003. Office Action for U.S. Appl. No. 09/928,474, filed Aug. 14, 2001.

May 8, 2003. Office Action for U.S. Appl. No. 09/637,620, filed Aug. 11, 2000.

May 23, 2003. Written Opinion for PCT/US01/24910.

Jun. 18, 2003. Office Action for U.S. Appl. No. 09/655,542, filed Sep. 6, 2000.

Jul. 23, 2003. Invitation to Pay Additional Fees and Communication Relating to the Results of the Partial International Search for PCT/US02/19116.

Aug. 1, 2003. Written Opinion for PCT/US01/27406.

Aug. 8, 2003. PCT International Search Report from PCT/US03/08513.

Aug. 20, 2003. Written Opinion for PCT/US01/22833.

Aug. 25, 2003. Office Action for U.S. Appl. No. 10/100,184, filed Mar. 19, 2002.

Sep. 15, 2003. Office Action for U.S. Appl. No. 09/928,474, filed Aug. 14, 2001.

Oct. 14, 2003. PCT International Search Report from PCT/US02/21942.

Oct. 20, 2003. PCT International Search Report from PCT/US02/19116.

Oct. 23, 2003. PCT International Preliminary Examination Report from PCT/US01/24910.

Nov. 5, 2003. Office Action for U.S. Appl. No. 10/172,977, filed Jun. 18, 2002.

Dec. 1, 2003. Office Action for U.S. Appl. No. 10/173,108, filed Jun. 18, 2002.

"NanoMapper wafer nanotopography measurement by ADE Phase Shift." Printed Dec. 9, 2003. http://www.phase–shift.com/nanomap.shtml.

"Wafer flatness measurement of advanced wafers." Printed Dec. 9, 2003. http://www.phase–shift.com/wafer–flatness.shtml.

"ADE Technologies, Inc.—6360." Printed Dec. 9, 2003. http://www.adetech.com/6360.shtml.

"3D optical profilometer MicroXAM by ADE Phase Shift." Printed Dec. 9, 2003. http://www.phase-shift.com/microxam.shtml.

"NanoMapper FA factory automation wafer nanotopography measurement." Printed Dec. 9, 2003. http://www.phase-shift.com/nanomapperfa.shtml.

Dec. 11, 2003. Office Action for U.S. Appl. No. 09/943,383, filed Aug. 31, 2001.

Cunningham, James A. 2003. "Using Electrochemistry to Improve Copper Interconnects." <http://www.e-insite.net/semiconductor/index.asp?layout=article&articleid=CA47465>.

Jan. 20, 2004. Office Action for U.S. Appl. No. 09/927,444, filed Aug. 13, 2001.

Jan. 23, 2004. International Search Report for PCT/US02/24860.

Feb. 2, 2004. Office Action for U.S. Appl. No. 09/363,966, filed Jul. 29, 1999.

Adams, Bret W., Bogdan Swedek, Rajeev Bajaj, Fritz Redeker, Manush Birang, and Gregory Amico. "Full-Wafer Endpoint Detection Improves Process Control in Copper CMP." *Semiconductor Fabtech*—12$^{th}$ Edition. Applied Materials, Inc., Santa Clara, CA.

Berman, Mike, Thomas Bibby, and Alan Smith. "Review of In Situ & In-line Detection for CMP Applications." *Semiconductor Fabtech*, 8$^{th}$ Edition, pp. 267-274.

Dishon, G., D. Eylon, M. Finarov, and A. Shulman. "Dielectric CMP Advanced Process Control Based on Integrated Monitoring." Ltd. Rehoveth, Israel: Nova Measuring Instruments.

"Semiconductor Manufacturing: An Overview." >http://users.ece.gatech.edu/~gmay/overview.html>.

* cited by examiner

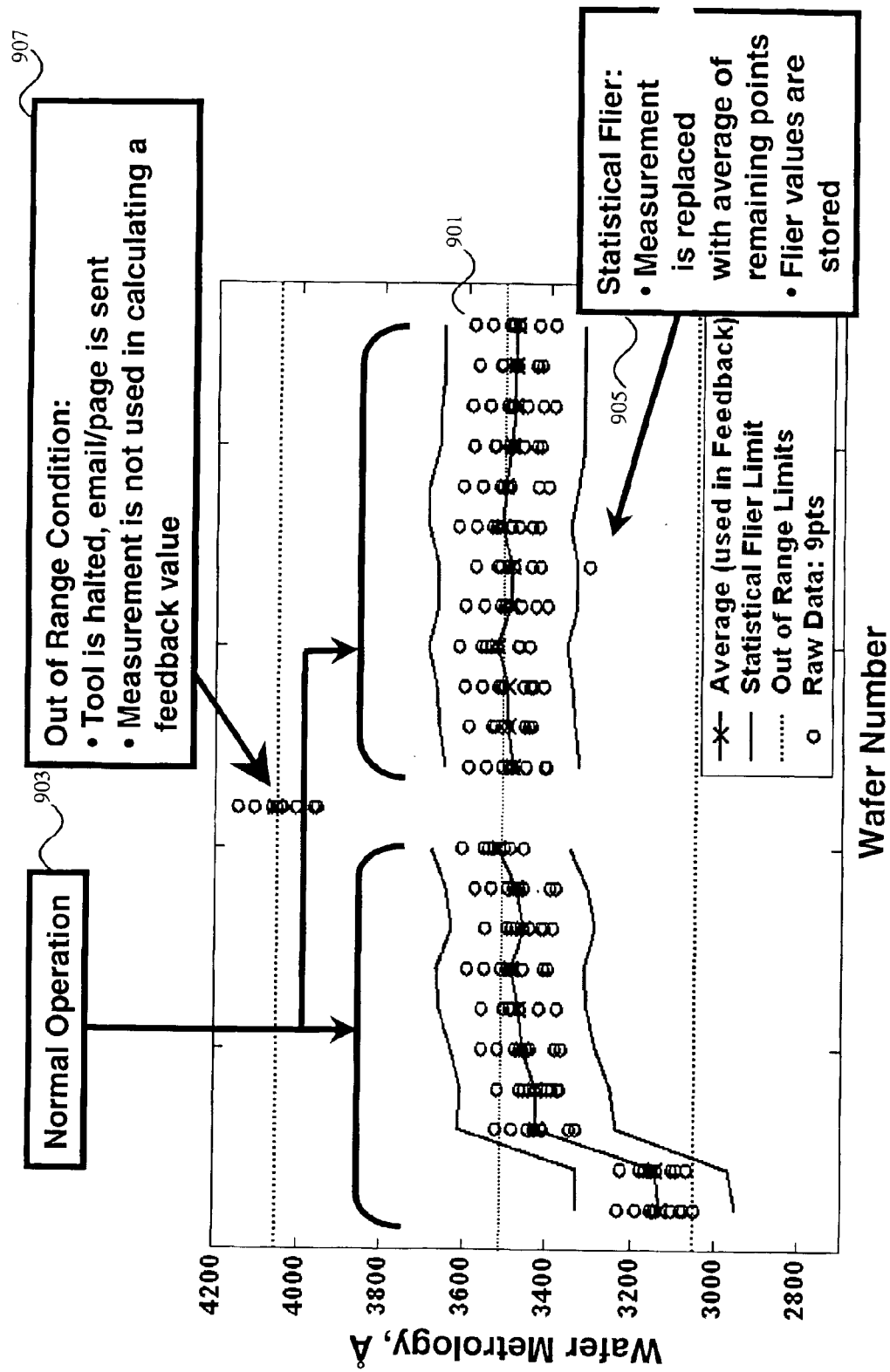

METHOD, SYSTEM, AND MEDIUM FOR HANDLING MISREPRESENTATIVE METROLOGY DATA WITHIN AN ADVANCED PROCESS CONTROL SYSTEM

RELATED APPLICATION

This application claims priority from U.S. Provisional Application No. 60/399,695, filed Aug. 1, 2002, which is incorporated herein by reference.

FIELD OF THE INVENTION

The present invention relates to improved feedback controllers designed for manufacturing semiconductor devices. In particular, the feedback controllers of the present invention include features to detect erroneous data points and to prevent those data points from affecting the operation of the feedback controllers.

BACKGROUND OF THE INVENTION

There is a constant drive within the semiconductor industry to increase the quality, reliability and throughput of integrated circuit devices, e.g., microprocessors, memory devices, and the like, while lowering the costs of manufacturing such devices. This drive is, in part, fueled by consumer demands for faster, higher quality computers and electronic devices at lower prices. These demands have resulted in continual improvements in the manufacturing of semiconductor devices.

In manufacturing semiconductor devices, it is a well-known practice to use feedback controllers to ensure high quality and low cost. An example of a feedback controller system 100, shown in FIG. 1, includes a tool 103 and a feedback controller 107 coupled each other. The tool 103 can be one or any combination of semiconductor-manufacturing tools such as a chemical mechanical planarization (CMP) tool, a depositor, an etcher, etc. In particular, the tool 103 receives wafers as input 101 and processes them according to a set of control parameters 109, e.g., recipes received from the controller 107. The processed wafers are referred to as outputs 105. Examples of processes are depositing a new layer of film, etching a layer, etc.

Once the tool 103 processes a wafer, one or more metrology stations, not shown in FIG. 1, make measurements on the processed wafer. The measurements are communicated to the controller 107. The controller 107 then compares the measurements to predicted values calculated previously. Based on the comparison, the controller 107 makes adjustments to the control parameters 109. For example, if the thickness of a newly deposited layer is outside of a desired range when the measurement is compared with the predicted value, the controller 107 adjusts one or more of the control parameters 109, e.g., the amount of gas flow, the length of processing time, etc., to deposit a thinner film on the next wafer. The tool 103 then receives another wafer and processes the wafer using the adjusted control parameters.

The performance of the feedback controller depends on, in part, receiving accurate measurements from the metrology stations. When inaccurate or erroneous measurements are received, the feedback controller needs to identify such measurements and have a mechanism to prevent such measurements from affecting the operation. In conventional feedback controllers, no robust mechanism was provided to address erroneous measurements. When erroneous measurements are entered repeatedly to the controller 107, they cause increased defects, low yields, or both in devices formed on processed wafers.

SUMMARY OF THE INVENTION

Embodiments of the present invention advantageously identify erroneous measurements and prevent the erroneous measurements from being input to a feedback controller. In particular, embodiments of the present invention provide a system, method and medium for initially identifying erroneous data points and preventing them from affecting the operation of the feedback controller. Embodiments of the present invention include features for receiving data points relating to an output of the tool. The data points include a current data point and at least one previous data point. The at least one previous data point is received before the current data point. Embodiments of the present invention also include features for determining whether the current data point is an erroneous outlier by comparing the current data point to a statistical representation of the at least one previous data point, and based on whether the at least one previous data point was also an outlier. Embodiments of the present invention further include features for disregarding the current data point in calculating a feedback value of the feedback control mechanism if the current data point is determined as an erroneous outlier.

BRIEF DESCRIPTION OF THE DRAWINGS

The detailed description of the present application showing various distinctive features may be best understood when the detailed description is read in reference to the appended drawing in which:

FIG. 9 is a graph illustrating example measurement values processed according to embodiments of the present invention.

DETAILED DESCRIPTION

A feedback system for a semiconductor manufacturing tool typically includes a metrology station (which can be internal to or external of the tool) to make measurements on one or more characteristics of outputs (e.g., processed wafers) of the tool and a feedback controller to change the operation of the tool based on data points (where a data point is calculated from or equivalent to one or more measurements of a wafer or wafers). Various embodiments of the present invention relate to feedback controllers that include features for identifying outlier data points (i.e., data points that are substantially different from one or more previous data points), for differentiating the outlier data points into erroneous outlier data points and non-erroneous outlier data points (e.g., outliers representing a change in the status of the tool), and for removing the erroneous data points from affecting the operation of the feedback controller and its tool. These embodiments are illustrated in connection with FIGS. 5–6. As noted above, a data point can be calculated from one or more measurements of a single wafer. These measurements can also contain outliers that are substantially different from other measurements taken from the wafer. In at least some embodiments of the present invention, these outlier measurements are identified and removed before calculating any data points for the wafer. These embodiments are described in connection with FIG. 7. In at least some embodiments of the present invention, portions or all of the features of the above-mentioned embodiments relating to identifying and removing outliers from measurements and data points can be combined into one system. These embodiments are described in connection with FIGS. 8A–8B.

Before various embodiments of the present invention are described, the general concept of outliers is first described in more detail. As noted above, an outlier is a data point that is significantly different from previous data points. The significance of the difference can be measured in terms of statistics, e.g., average, median, standard deviation, etc. An outlier data point may indicate that a change has occurred in the tool and that a response by the feedback controller may be required (e.g., adjusting control parameters). In other instances, an outlier data point may indicate that the measurements made by the metrology station are erroneous (i.e., an erroneous outlier data point). In such a case, the erroneous outlier data point is removed from affecting the operation of the feedback controller. To further explain these concepts, an example of an erroneous outlier is illustrated in FIG. 2, and an outlier data point representing a non-erroneous outlier is illustrated in FIG. 3.

Figure 2:
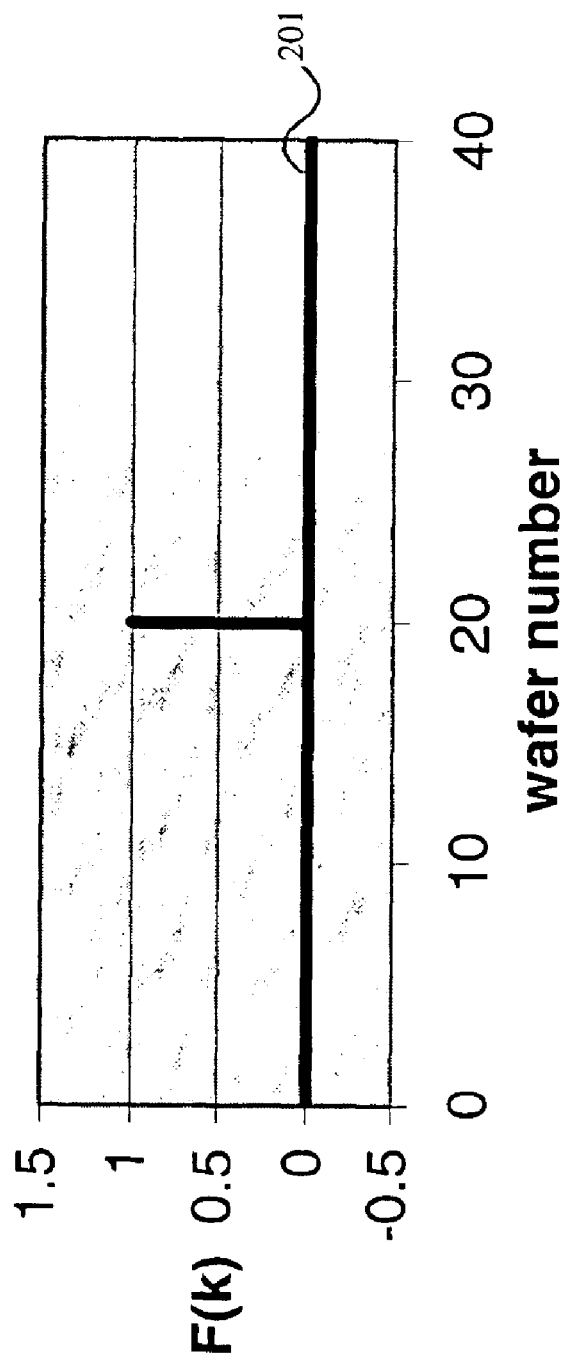
FIG. 2 is a graph illustrating an example outlier data point.

More specifically, in FIG. 2, a black line 201 depicts a trace of differences between data points and their respective predicted values in a sequence of processed wafers. In the present invention, the predicted values are calculated based on, in part, previous data points. In the y-axis, difference values, F(k), of the processed wafers are shown. Processed wafer 20 has its difference value at 1, while wafers 1–19 and 21–40 have their difference values at zero. The data point for wafer 20 depicted in FIG. 2 misrepresents or incorrectly characterizes the processes that took place in the tool because the difference value jumps to 1 for wafer 20 and drops back to zero. It may also represent an error in calculating the data point that was the basis for calculating the difference value. Such a data point is preferably treated as an erroneous input. Accordingly, it is desirable to prevent such a data point from being input to the feedback controller.

Figure 3:
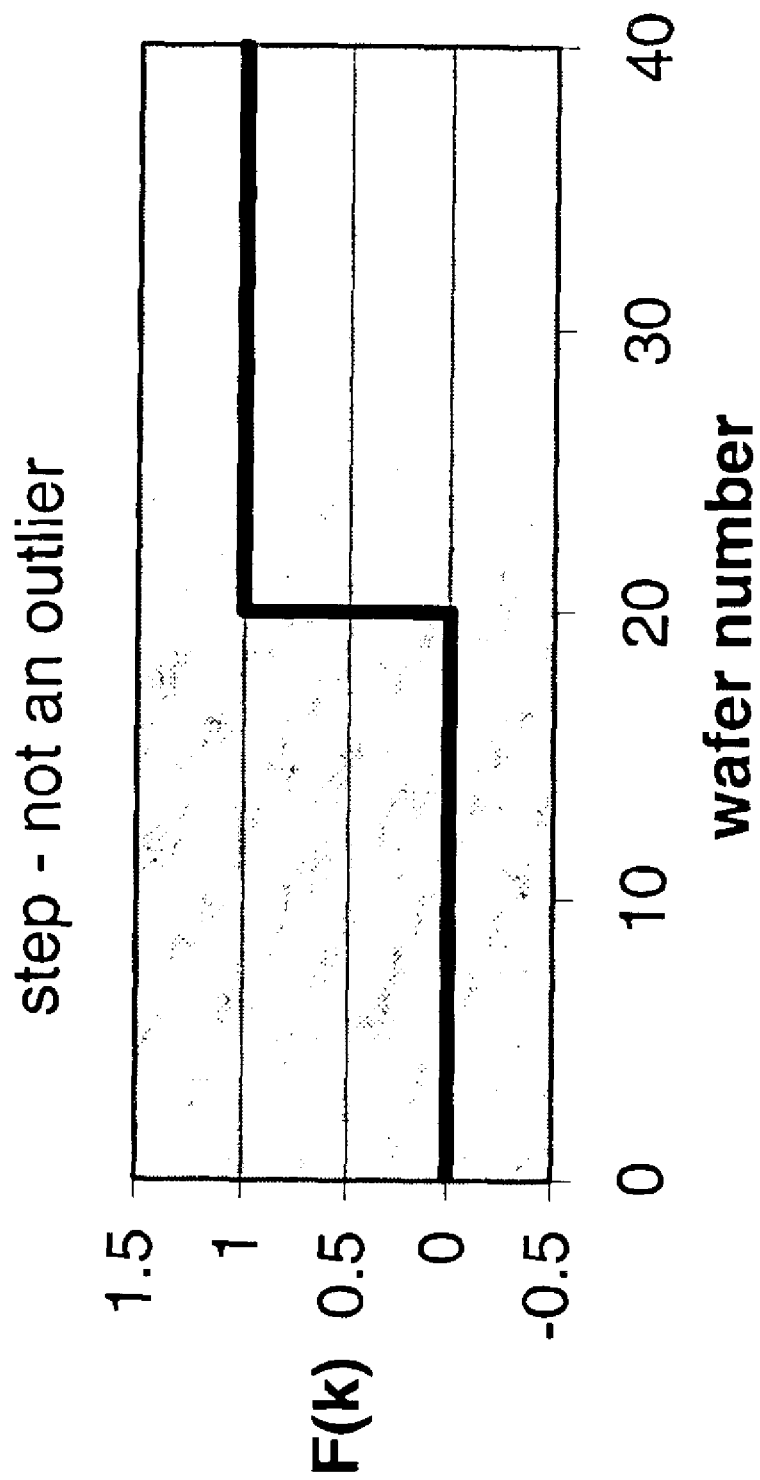
FIG. 3 is a graph illustrating an example step change.

In FIG. 3, a similar change occurs at processed wafer 20, but the difference values stay at 1 for wafers 21–40. In such a case, the difference value for wafer 20 most likely represents the leading edge of a change rather than an erroneous outlier. The change illustrated in FIG. 3 contains relevant information regarding the processes that took place in the tool. Accordingly, it is desirable to input the data point at the leading edge of the change to the feedback controller in order to make appropriate adjustments.

Figure 1:
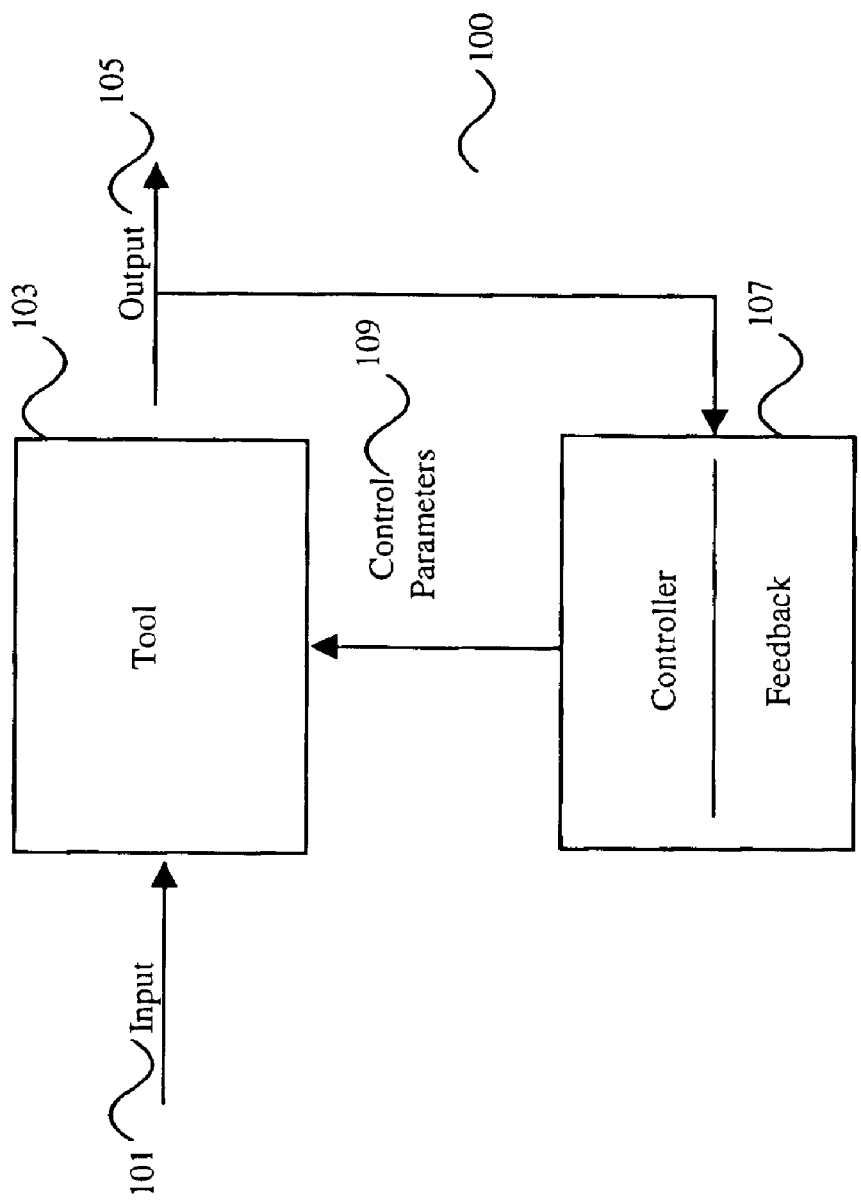
FIG. 1 is a block diagram illustrating a conventional feedback control system.
Figure 4:
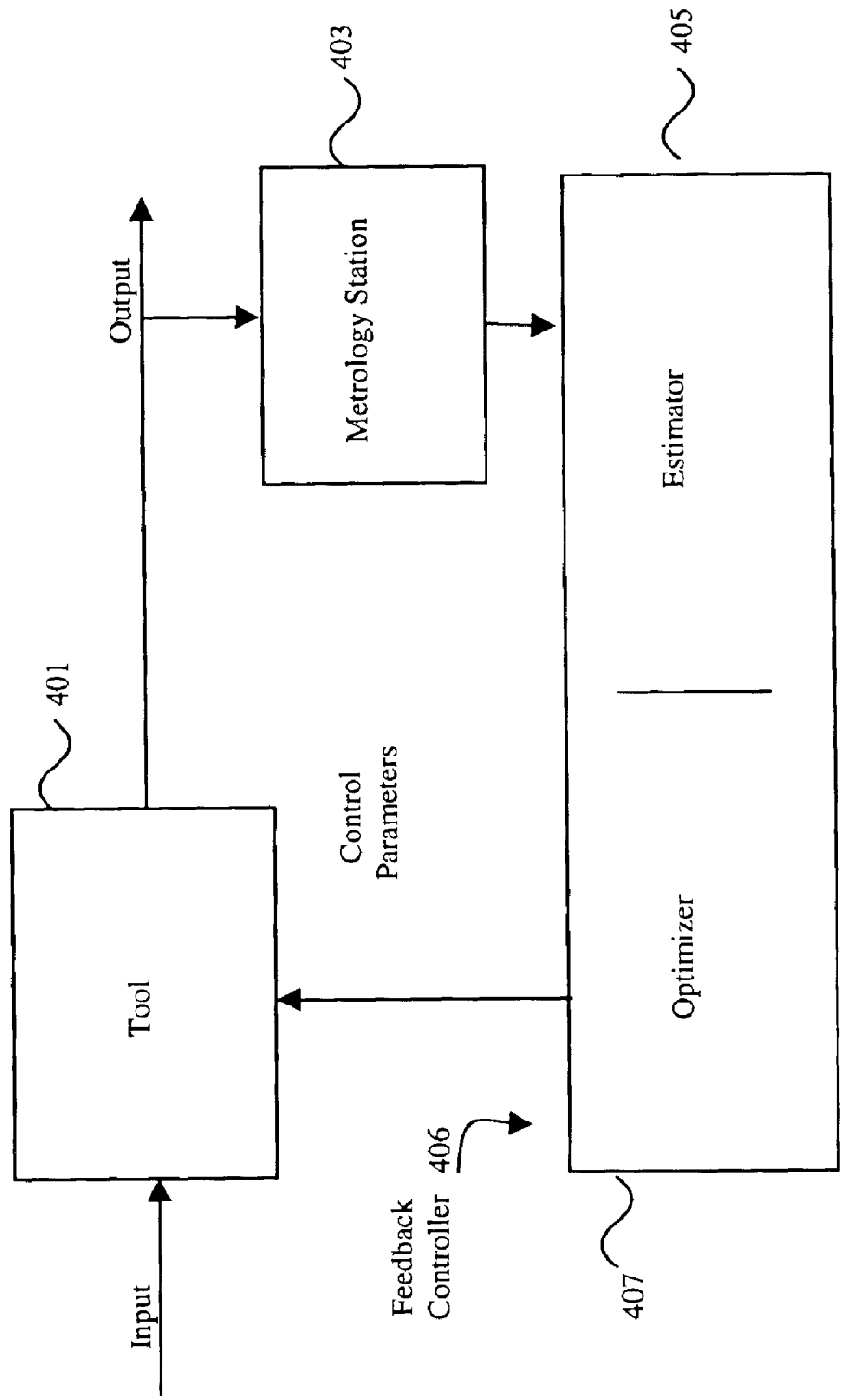
FIG. 4 is a block diagram illustrating a feedback controller that includes an optimizer and an estimator according to embodiments of the present invention.

To distinguish erroneous outliers from non-erroneous outliers, embodiments of the present invention include, among other features, a tool 401, one or more metrology stations 403, and a feedback controller 406 that includes an estimator 405 and an optimizer 407 as illustrated in FIG. 4. The tool 401 is similar to that described above in connection with FIG. 1. The metrology stations 403 (which can be part of, or external to, tool 401) are configured to make one or more measurements on the processed wafers. In particular, the measurements can be of different categories, e.g., the thickness of deposited films, various features of transitions, etc. The metrology stations 403 can also make one or more measurements for each category measurement. For instance, the metrology stations 403 can measure the thickness of a wafer at multiple points on a processed wafer.

The values of the measurements made by the metrology stations 403 are communicated to the controller 406. Upon receiving the measurement values, the estimator 405 calculates one or more data points from the measurements. The estimator 405 is configured to improve prediction capabilities of the controller 406 based on new information, e.g., data points, etc.

Figure 5:
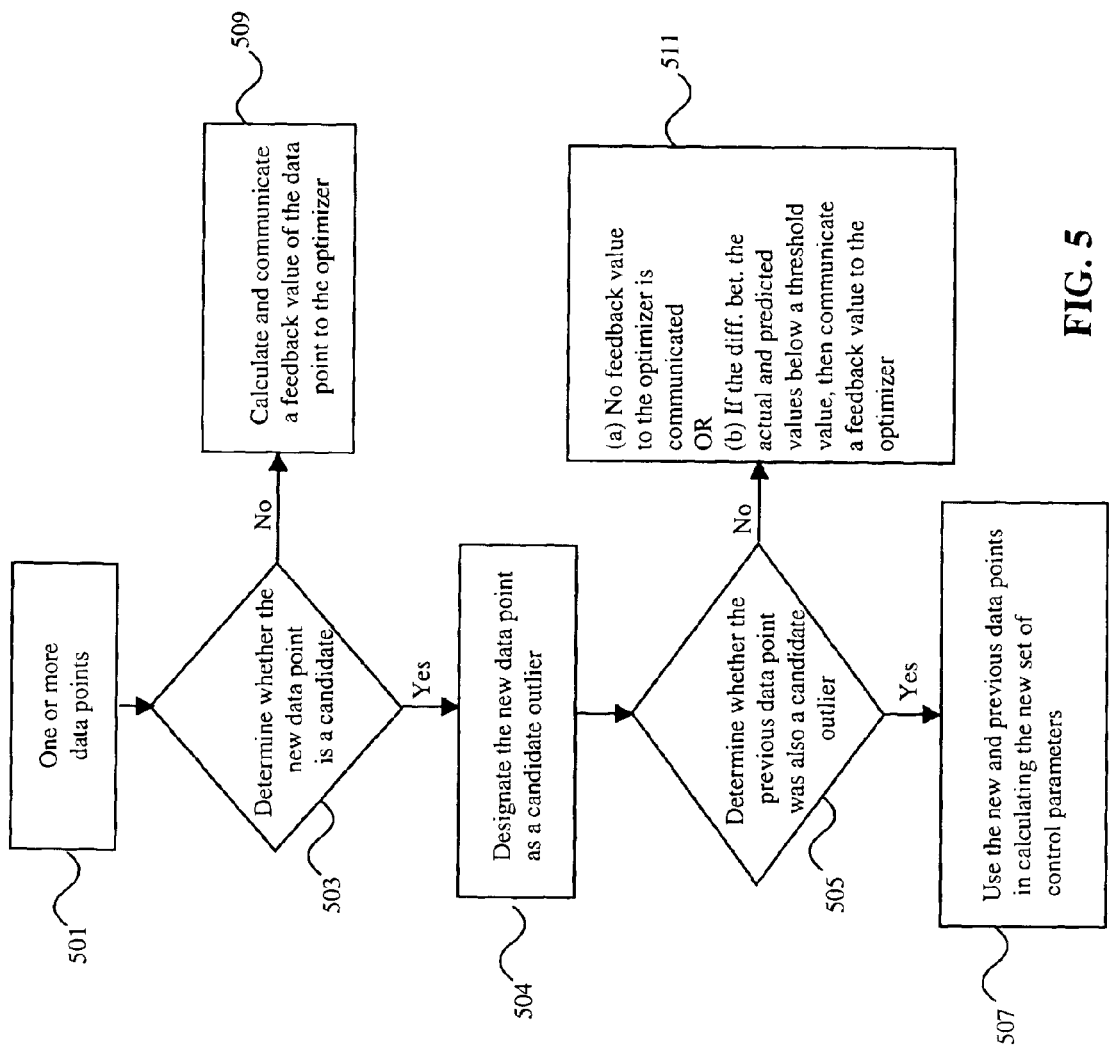
FIG. 5 is a flow chart illustrating high level features of the estimator according to embodiments of the present invention.

Once a data point is calculated, it is processed as shown in FIG. 5. In particular, the estimator 405 determines if the new data point is significantly different from the predicted value, and can thus be considered a "candidate" outlier (step 503). If so, the data point is designated as a candidate outlier (step 504). It is called a candidate because whether the outlier is an erroneous data point or a data point representing a change is determined later. If the data point is not a candidate outlier, then the estimator 405 calculates and communicates a feedback value of the data point to the optimizer 407 (step 509). Here, the feedback value is a value proportional to the difference (if any) between the value of the data point and the predicted value calculated by the controller 406. The optimizer 407 then uses the feedback value in calculating a new set of control parameters. In embodiments of the present invention, the optimizer 407 is configured to produce control parameters in an optimal way (e.g., minimal changes to the control parameters while meeting all targets in driving the tool to produce desired outputs).

If the data point is a candidate outlier, and the previous data point was not marked as a candidate outlier (as determined by step 505 in processing the previous data point), the data point is most likely an erroneous data point (i.e., an erroneous outlier) similar to the one depicted in FIG. 2. As such, no feedback value is communicated to the optimizer 407 (step 511(a)). In other words, such a data point is removed from affecting the operation of the optimizer 407. It follows that if the previous data point is not a candidate outlier, the data point is a candidate, and a subsequent data point is not a candidate, then the data point is an erroneous data point.

In at least some embodiments of the present invention, the estimator 405 determines if two or more previous data points were marked as outliers instead of just one previous data point. In such embodiments, if the two or more previous data points were not marked as outliers, the data point is designated as an erroneous outlier. Once again, no feedback value is communicated to the optimizer 407. When no feedback value is communicated, the optimizer 407 can use the previous set of control parameters in controlling the tool 401.

In at least some embodiments, instead of preventing the feedback value of every candidate outlier from being input to the optimizer 407, a threshold test is first performed. In these embodiments of the present invention, even if the new data point is determined to be a candidate outlier, if the difference between the data point and the predicted value falls below/above the threshold value, then a feedback value is communicated to the optimizer 407 to be used in calculating the control parameters. It should be noted that the threshold can also be a range as well.

If the estimator 405 determines that the previous data point was also an outlier (or a candidate outlier), this condition is similar to the one depicted in FIG. 3 because the change that took place with the previous data point continues in the current data point. In such a case, the feedback value of the previous data point would not have been communicated to the optimizer 407 for the previous data point, when it should have been because it represented a change. Hence, the estimator 405 first calculates the feedback value of the previous data point, and the feedback value of the new data point is then calculated. The latter value is communicated to the optimizer 407 to be used in calculating the control parameters (step 507).

Although the above description is provided for processing one data point to calculate one feedback value, any number of data points can be used in calculating any number of feedback values. Hence, the optimizer 407 is configured to receive any number of feedback values from the estimator 405. More specifically, when it receives the feedback values from the estimator 405, the optimizer 407 calculates a new set of control parameters. In calculating the new set of control parameters, the optimizer 407 may simply make adjustments to the previous set of control parameters based on the feedback values received.

Figure 6:
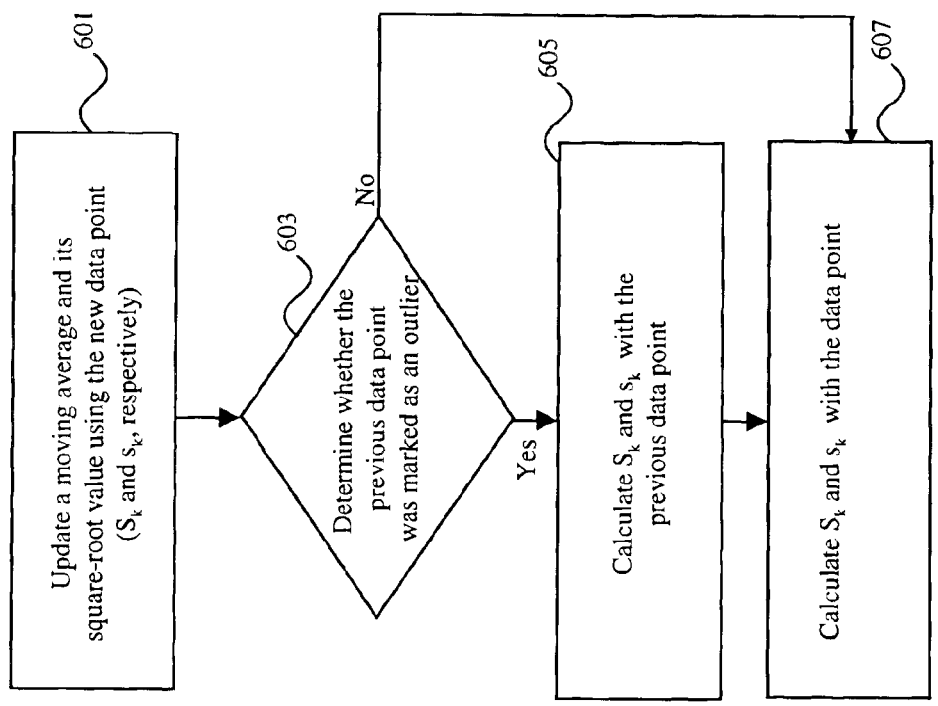
FIG. 6 is a flow chart illustrating features of the estimator with respect to determining an outlier according to embodiments of the present invention.

The above-described features of the controller 406 are now described in more detail by referring to FIG. 6. More specifically, in at least some embodiments of the present invention, in order to determine if a data point is a candidate outlier, a statistical filter is used. In at least some embodiments of the present invention, an exponentially-weighted moving average (EWMA) filter is used. In embodiments of the present invention, other types of filters can also be used, e.g., finite-impulse response, infinite-impulse response, or wavelet-based filters. In the following example, the exponentially-weighted moving average for variance of prediction value can be expressed as:

$$S_k = \beta(F_k - \Delta_k)^2 + (1-\beta)S_{k-1}$$

The corresponding value of standard deviation is expressed as:

$$s_k = \sqrt{S_k}$$

where,

1. $\beta$ is a coefficient used for the EWMA filter;
2. $F_k$ is the difference between the data point and predicted value for wafer k, and it can be expressed as $y_{k-1}^{actual} - y_{k-1}^{predicated}$, where
   $y_{k-1}^{actual}$ is the actual value measured at time/wafer k−1; and
   $y_{k-1}^{predicted}$ is the predicted value at time/wafer k−1; and
3. $\Delta_k$ is a feedback value for time k, $\Delta_k$. One example set of equations for calculating a feedback value is as follows:

if $|F_k - \Delta_k| \leq K_n s_k$ $\Delta_{k+1} = \lambda_k F_k + (1-\lambda_k)\Delta_k$ else $\Delta_{k+1} = \Delta_k$ where, $\lambda_k$ is a coefficient used for the EWMA-based filter, which is optionally a function of time and/or other processing events (the value of $\lambda_k$ may also be set to be a function of wafer number, distance from target or another type of process related event such as the beginning of a new lot or change in process condition); and $K_n$ is a value called outlier coefficient, which can be set to a certain value, e.g., 0.1.

As the above equations for the feedback value indicate, the feedback value is updated when the difference between $F_k$ and the feedback value is greater than a specified threshold value, $K_n s_k$. This places a limit on the size of adjustments the optimizer 407 may make.

Using the above-described equations, the step of determining whether the data point is a candidate outlier is described. First, when a data point is received, a moving average and its square-root values are updated (step 601). Using these values, a threshold test is performed to determine when the data point is a candidate outlier. For instance:

if $(F_k - \Delta_k) \geq Ks_{k-1}$, the data point can be marked as "candidate=1";

if $(F_k - \Delta_k) \leq -Ks_{k-1}$, the data point is marked as "candidate =−1"; and in all other cases the data point is marked as "candidate =0".

In other words, the data point is marked as a candidate outlier if $|F_k - \Delta_k|$ is greater than $Ks_{k-1}$, and it is not marked as an outlier otherwise. Here, K is set to a certain value, e.g., 3. The actual marking is designated as follows:

"0" if the data point is not a candidate;

"1" if actual value for the data point is significantly higher than predicted value and feed back (a candidate); and "−1" if actual value for the data point is significantly lower than predicted value and feed back (a candidate).

After determining whether a data point is a candidate or not, the estimator 405 determines a state of the data point. Here, a state indicates whether the previous data point was marked as an outlier (step 603):

if the data point is not a candidate outlier, the state is set to 'regular';

if the data point is a candidate outlier and the previous data point was not marked as an outlier, then the data point is meanwhile regarded as an outlier, and the state is set to 'ignore'; and if the data point is a candidate outlier and the previous data point was not marked as an outlier, both points are used for the filter calculations, and the state is set to 'two'.

The following is a set of pseudo codes that capture the above-described feature of setting the state of the data point:

```
If candidate == 0
    State = 'regular'
If candidate != 0 and candidate*prev_candidate != 1
    State = 'ignore'
If candidate != 0 and candidate*prev_candidate == 1
    State = 'two'
capture pos and neg.
```

Once the state is set as described above, the estimator 405 performs the steps described in connection with FIG. 5 in calculating the feedback value. In addition, the estimator 405 also calculates various values of the exponentially-weighted moving average filter and its variance to be used when the next data point arrives: If state=='two' and new data point was marked as "−1" or "+1": The following equations calculate the values for the previous and the present data points (steps 605 and 607) and feedback values.

$$S_{k-1} = \beta(F_{k-1} - \Delta_{k-1})^2 + (1-\beta)S_{k-1} \quad | \quad \Delta_k = \lambda_{k-1}F_{k-1} + (1-\lambda_{k-1})\Delta_{k-1}$$
$$S_k = \beta(F_k - \Delta_k)^2 + (1-\beta)S_{k-1} \quad | \quad \Delta_{k+1} = \lambda_k F_k + (1-\lambda_k)\Delta_k$$
$$s_k = \sqrt{S_k}$$

If state=='regular': The following equations calculate the values for the present data points (step 607) and feedback values.

$$S_k = \beta(F_k - \Delta_k)^2 + (1-\beta)S_{k-1} \quad | \quad \text{if } |F_k - \Delta_k| \geq K_n s_k$$
$$\quad\quad\quad\quad\quad\quad\quad\quad\quad\quad | \quad \Delta_{k+1} = \lambda_k F_k + (1-\lambda_k)\Delta_k$$
$$s_k = \sqrt{S_k} \quad\quad\quad\quad\quad\quad\quad | \quad \text{else}$$
$$\quad\quad\quad\quad\quad\quad\quad\quad\quad\quad | \quad \Delta_{k+1} = \Delta_k$$

If state=='ignore' (implemented also if no wafer arrived in case of missing data): The previously set values are as indicated below.

$$S_k = S_{k-1}$$
$$\quad\quad\quad\quad | \quad \Delta_{k+1} = \Delta_k$$
$$s_k = \sqrt{S_k}$$

Now turning to describe embodiments relating to identifying and removing outlier measurements in calculating data points, the outlier measurements may occur due to problems related to the metrology stations such as misalignment of the measurement coordinates or due to physical phenomena such as the presence of particles. These problems negatively influence the measurement accuracy. Therefore, it is desirable to identify and remove outlier measurements before they are used in calculating data points. In at least some embodiments of the present invention, measurements and information needed to determine outliers are resource specific. This means the information is retained based upon which specific tool or chamber the wafer was processed. Also, the values for the statistical analysis are advantageously maintained as relative values rather than as absolute values.

In these embodiments, the estimator 405 receives a number of measurements from one or more of metrology stations 403 (step 701). In particular, the estimator 405 retains sufficient information to determine in which specific tool or chamber the wafer was processed. After receiving the measurements from the metrology stations, the estimator 405 calculates their mean and variance values (step 703). In particular, the mean and variance are expressed as:

$$M_i = \frac{1}{n_i} \sum_{k=1}^{n_i} x_{ik}$$

$$V_i = \left(\frac{1}{n_i - 1}\right) \sum_{k=1}^{n_i} (x_{ik} - M_i)^2$$

where,
data sets are designated as set j and run/wafer i;
$M_i$ is the mean; and
$V_i$ is the variance.

The mean and variance values can be calculated using a portion or all of the population of the measurements collected for the run/wafer i. The set i corresponds to data which is a subset of the total measurements performed, defined as $x_{ik}$ where $k=1, \ldots, n_i$, with $n_i$ being the fraction of the total data collected for the run/wafer i.

Since in most semiconductor manufacturing processes the variation of the metrology scales with the average value, a scaling operation (i.e., dividing the variance by a squared mean) can be performed and stored as a scaled variance, $D_i$. However, a check is performed before the scaling operation to determine if the mean is too small to perform a scaling operation, e.g., a half of a squared mean value is smaller than the variance (step 705). If the scaling is performed, a register called "FLAG" is set to one (step 709). If the scaling is not performed, the "FLAG" register and the scaled variance are set to zero (step 707). The following is a set of equations describing these features:

if $(V_i < M_i^2 / 2)$

FLAG = 1

$D_i = \frac{V_i}{M_i^2}$ else $D_i = 0$

FLAG = 0

The estimator 405 then calculates a filtered estimate of the $D_i$ and $V_i$, which are designated as $D_{i+1}^f$ and $V_{i+1}^f$, respectively (step 711). One example filter is the EWMA.

if i=1

$D_{i+1}^f = D_i$ $V_{i+1}^f = V_i$ else $D_{i+1}^f = \lambda \cdot \min(D_{i+1}, D_i) + (1-\lambda) \cdot D_i^f$ $V_{i+1}^f = \lambda \cdot \min(V_{i+1}, V_i) + (1-\lambda) \cdot V_i^f$ The estimator 405 then calculates the standard deviation, $\sigma_i$. This value is calculated in two different ways based on to which value the "FLAG" was set (step 713).

if i=1 if FLAG=1

$\sigma_i = \sqrt{D_i}$ else $\sigma_i = \sqrt{V_i}$ else if FLAG=1

$\sigma_i = \sqrt{\overline{D}_i}$ else $\sigma_i = \sqrt{\overline{V}_i}$

The estimator 405, which receives a reliability level from a user (step 715), calculates a sigma coefficient $K_p$, based on the reliability level. The estimator 405 also calculates the median, $R_{ji}$, of the measurement values (step 717). Using the median, $R_{ji}$, for run/wafer i data set j, the sigma coefficient $K_f$, and the filtered estimate of the standard deviation $\sigma_j$, the estimator 405 calculates an interval (step 719). An example of the interval can be expressed as:

if FLAG=1

$$R_{ji}-K_f\sigma_i R_{ji} \leq x_{ki} \leq R_{ji}+K_f\sigma_i R_{ji}$$

else $$R_{ji}-K_f\sigma_i \leq x_{ki} \leq R_{ji}+K_f\sigma_i$$

The estimator 405 calculates the average of the set of measurement values that fall within the interval (step 721). The estimator 405 replaces all measurements in set j that lie outside the interval with the average value, and sets these points to be outliers (step 723). The estimator 405 then recalculates and stores the filtered estimate values (step 725). The value of X is configurable in a graphical user interface.

Figure 7:
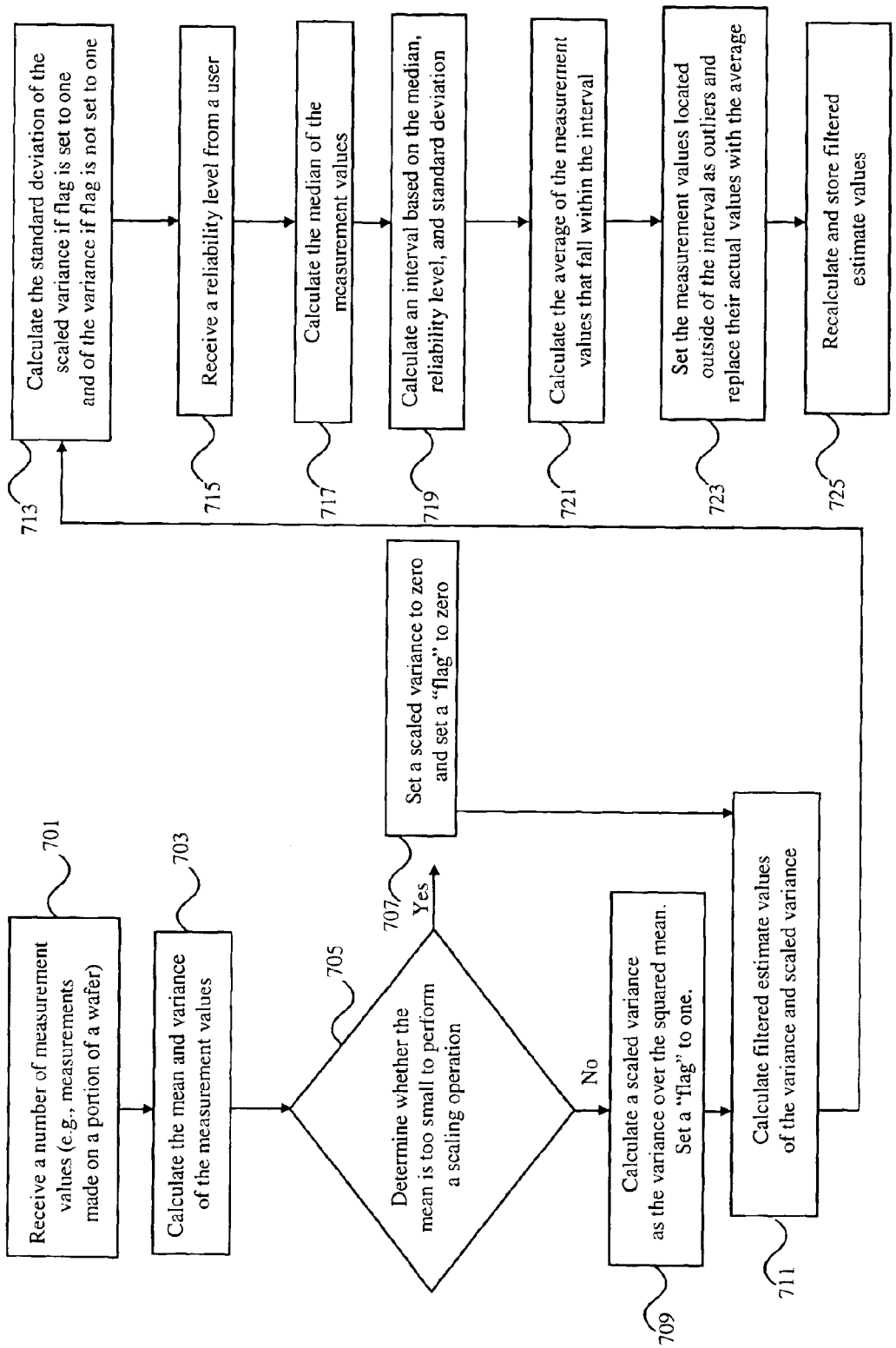
FIG. 7 is a flow chart illustrating features of the estimator with respect to adjusting measurements according to embodiments of the present invention.

Although embodiments described above in connection with FIG. 7 have been separately described from the embodiments describe above in connection with FIGS. 5–6, it should be noted that features of these embodiments can be combined. For instance, when one or more metrology stations make a number of measurements on a processed wafer, these measurements can first undergo the calculations as illustrated in FIG. 7. Subsequently, the calculated averages are designated as data points, and then can undergo the processes as illustrated in FIGS. 5–6. Example embodiments of the present invention that combine the features mentioned above are described below in connection with FIGS. 8A and 8B.

Figure 8A:
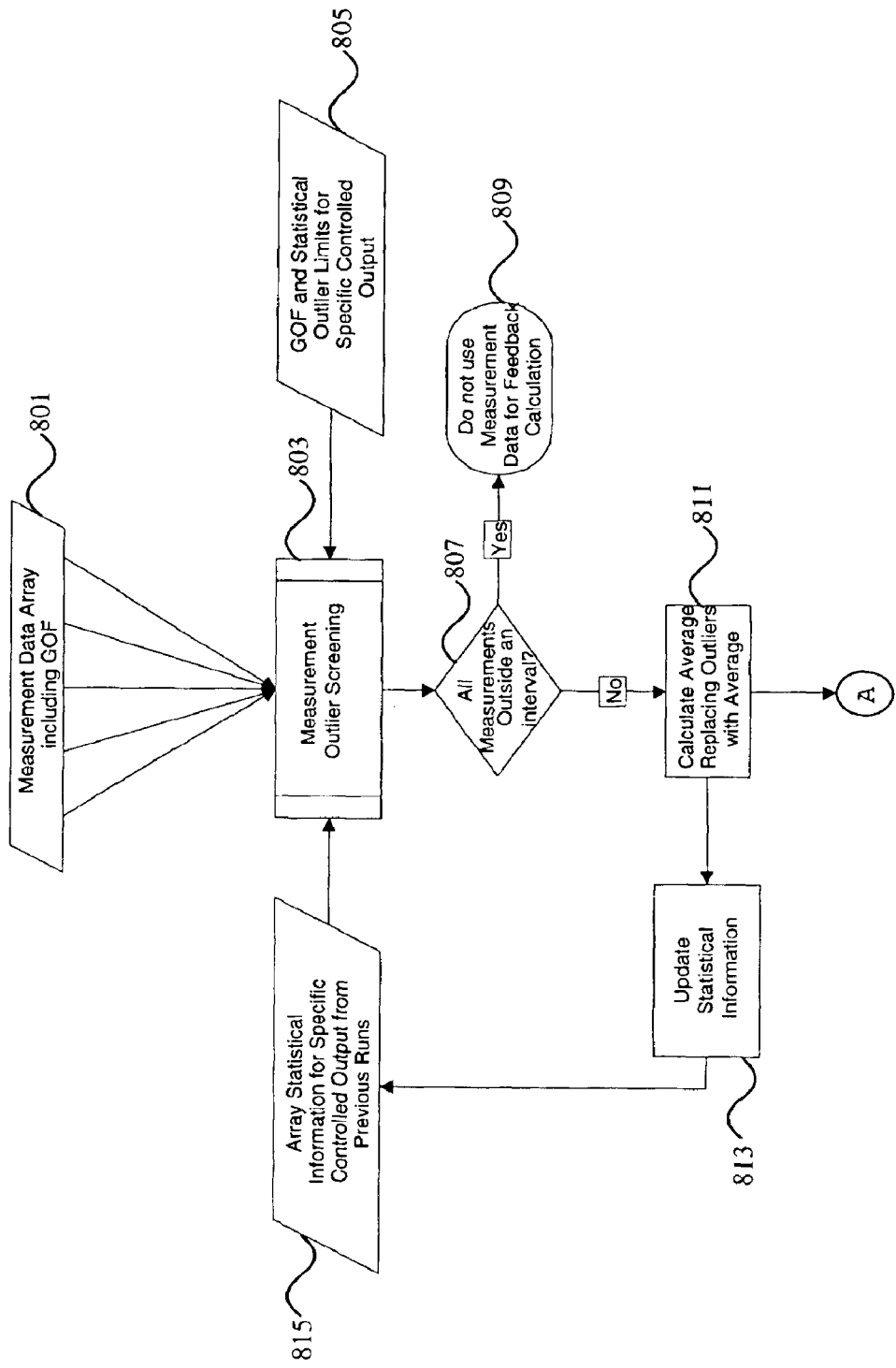
FIGS. 8A and 8B are flow charts illustrating features of overall sequence of steps according to embodiments of the present invention.
Figure 8B:
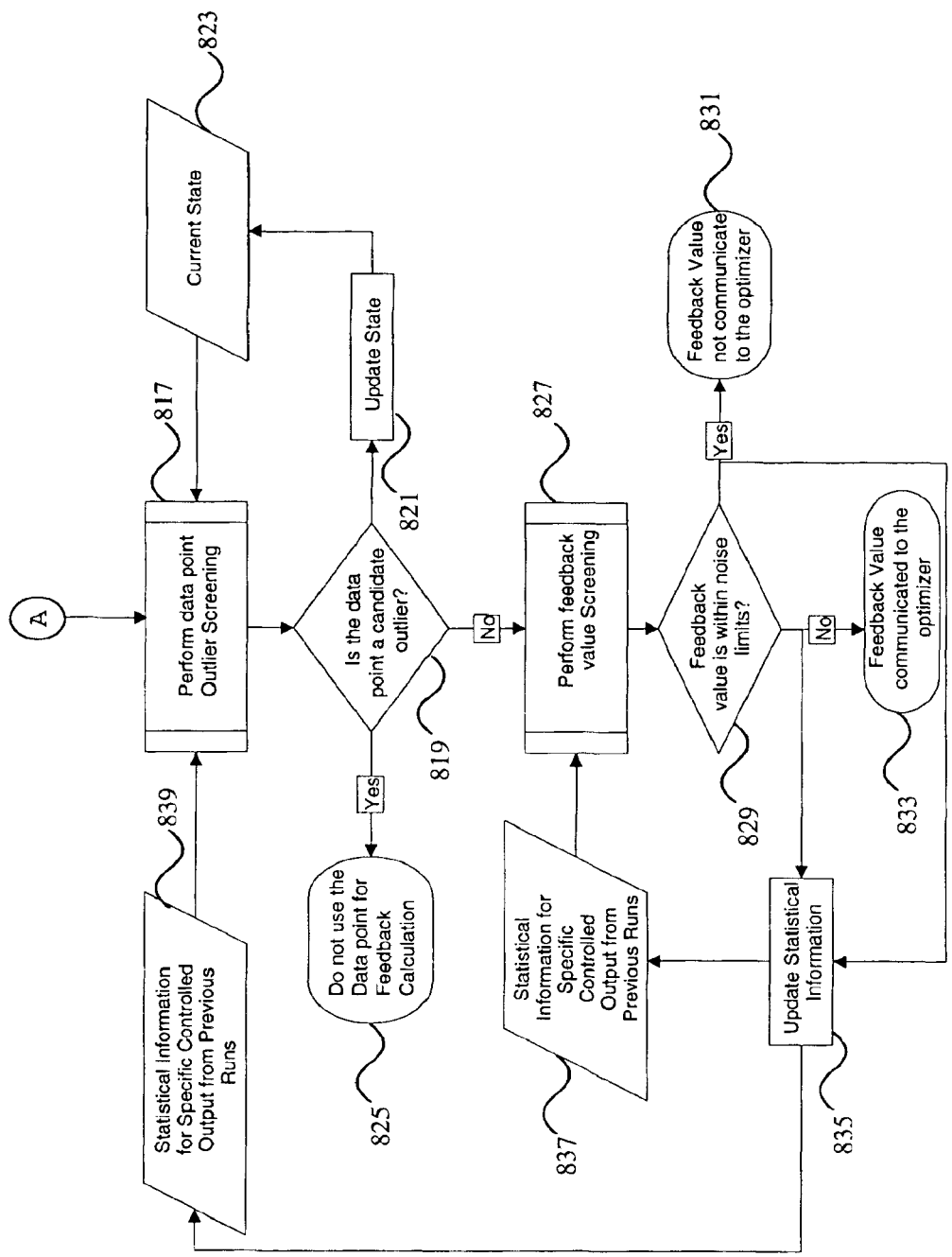

As illustrated in FIG. 8A, measurements that include the value of goodness-of-fit (GOF) are received from the metrology stations 403 (step 801). The estimator 405 conducts a measurement outlier screening (step 803). This step is similar to the steps described above in connection with calculating an interval for the measurements; however, in these embodiments, the GOF and statistical outlier limits for specifically controlled output are provided from memory (805). If all measurements are outside the interval, then the measurements are not used in calculating a feedback value (step 809). If all measurements are not outside the interval, then the estimator 405 calculates the average value of the measurements that fall within the interval (step 811). The estimator 405 then updates statistical information (step 813), which can then be stored as an array of statistical information for specific controlled output from previous runs (step 815).

The average value calculated in step 811 is used as a data point. The estimator 405 performs a data point outlier screen step, which determines whether the data point is a candidate outlier similar to the steps described above in connection with FIGS. 5–6. Based on step 817, the estimator 405 determines if the data point is an outlier. If it is an outlier, then the data point is not used in calculating a feedback value (step 825). A state of the data point is determined similar to the steps described above in connection with steps 603, 605 and 607 (step 821). The estimator 405 stores the current state of the data point (step 823). If the data point is not an outlier, the estimator 405 performs a feedback value screening (step 827), which is similar to the threshold test described above in connection with FIGS. 5–6. Based on the feedback value screening, the estimator 405 determines whether the feedback value is within noise limits (step 829). If the feedback value is within the noise limits, then the feedback value is not communicated to the optimizer 407 (step 831). Otherwise, the feedback value is communicated to the optimizer (step 833). Regardless of whether the feedback value falls within the noise limits, the estimator updates statistical information of relating to the data point (step 835). The resulting values are stored as statistical information for specific controlled output from previous runs to be used in performing the feedback outlier screening (step 837) and noise screening steps (step 839).

The results of performing the above-described embodiments of the present invention are graphically illustrated in FIG. 9. In particular, each data point represents a wafer being processed by Chemical Vapor Deposition (CVD). A metrology station collects thickness measurements of the processed wafers. For the measurements within normal operation, the average values of the measurements are used as the data points. When the measurements are out of range 907 (e.g., above a threshold value set to detect catastrophic cases), then the tool is halted and a message (e.g., an e-mail message and/or page) is sent to an operator. Moreover, such a set of measurements is not used in calculating a feedback value. When one of the measurements is out of an interval (e.g., 905), then the measurement is replaced with the average of the measurements within the interval and the filter values are stored.

Embodiments of the present invention can be implemented as a set of computer executable codes (e.g., computer programs), implemented using computer hardware, or any combination of them. In particular, embodiments of the present invention are described in terms of various flow charts as shown in FIGS. 5–8A, B. Various acts depicted in the flow charts can be implemented as codes in computer programs or using computer hardware.

Figure 10:
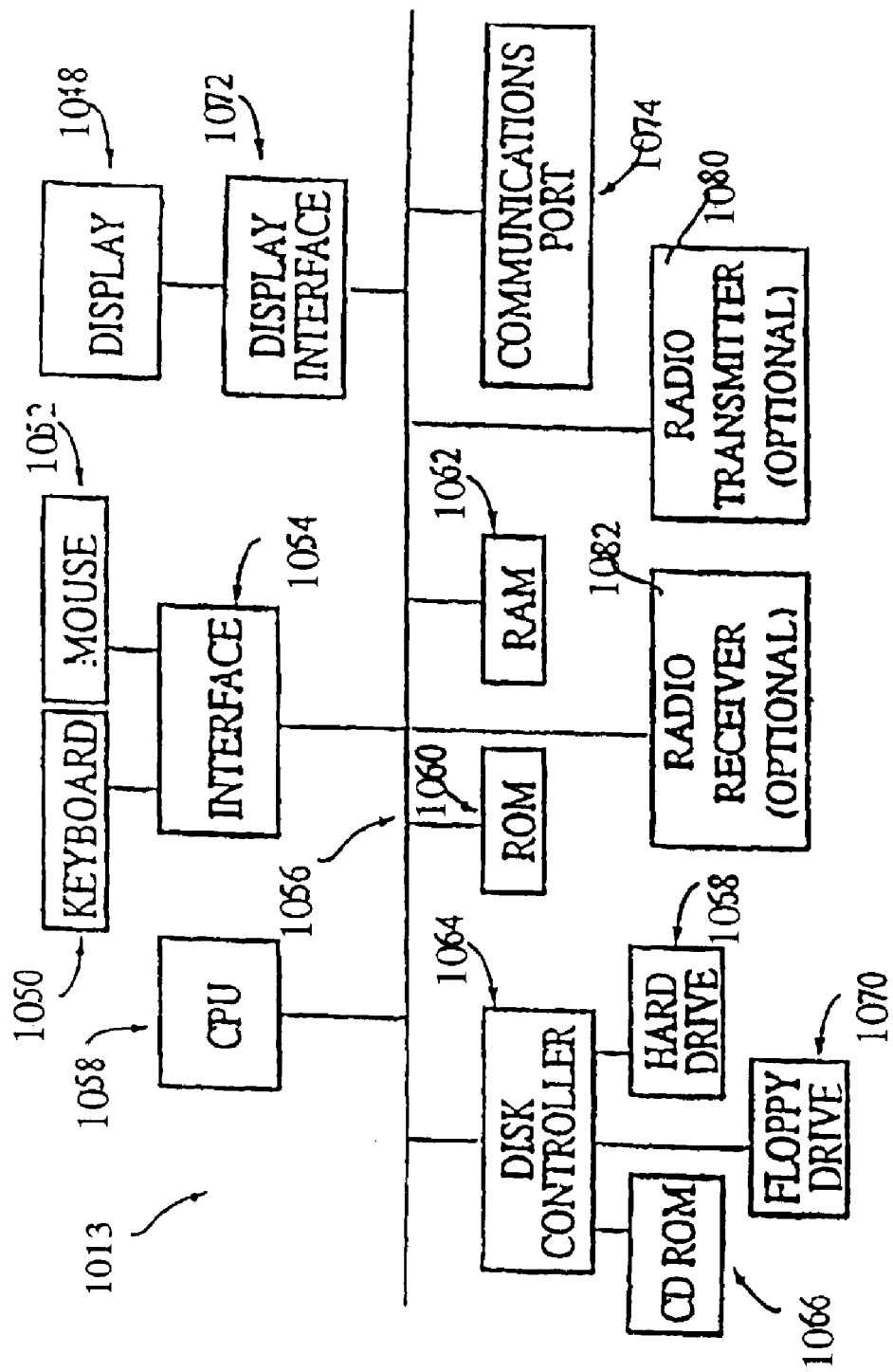
FIG. 10 is a block diagram representation of a computer within which an example embodiment of the feedback controller can operate according to embodiments of the present invention.

Now turning to describe the software implemented embodiments of the present invention, FIG. 10 illustrates a block diagram of such embodiments. A bus 1056 serves as the main information highway interconnecting various components. CPU 1058 is the central processing unit, performing calculations and logic operations required to execute the processes of the present invention as well as other programs. Read only memory (ROM) 1060 and random access memory (RAM) 1062 constitute the main memory. Disk controller 1064 interfaces one or more disk drives to the system bus 1056. These disk drives are, for example, floppy disk drives 1070, or CD ROM or DVD (digital video disks) drives 1066, or internal or external hard drives 1068. These various disk drives and disk controllers are optional devices.

A display interface 1072 interfaces display 1048 and permits information from the bus 1056 to be displayed on display 1048. Communications with external devices such as the other components of the system described above, occur utilizing, for example, communication port 1074. Optical fibers and/or electrical cables and/or conductors and/or optical communication (e.g., infrared, and the like) and/or wireless communication (e.g., radio frequency (RF), and the like) can be used as the transport medium between the external devices and communication port 1074. Peripheral interface 1054 interfaces the keyboard 1050 and mouse 1052, permitting input data to be transmitted to bus 1056. In addition to these components, the analyzer also optionally includes an infrared transmitter and/or infrared receiver. Infrared transmitters are optionally utilized when the computer system is used in conjunction with one or more of the processing components/stations that transmits/receives data via infrared signal transmission. Instead of utilizing an infrared transmitter or infrared receiver, the computer system may also optionally use a low power radio transmitter 1080 and/or a low power radio receiver 1082. The low power radio transmitter transmits the signal for reception by components of the production process, and receives signals from the components via the low power radio receiver. The low power radio transmitter and/or receiver are standard devices in the industry.

Although the embodiments depicted in FIG. 10 are illustrated having a single processor, a single hard disk drive and a single local memory, the analyzer is optionally suitably equipped with any multitude or combination of processors or storage devices. For example, the various embodiments may be replaced by, or combined with, any suitable processing system operative in accordance with the principles of embodiments of the present invention, including sophisticated calculators, and hand-held, laptop/notebook, mini, mainframe and super computers, as well as processing system network combinations of the same.

Computer readable memory medium stores computer readable code or instructions. As one example, the medium may be used with disk drives illustrated in FIG. 10. Typically, memory media such as a CD ROM, a digital video disk, or floppy disks will contain, for example, a multi-byte locale for a single byte language and the program information for controlling the modeler to enable the computer to perform the functions described herein. Alternatively, ROM 1060 and/or RAM 1062 illustrated in FIG. 10 can also be used to store the program information that is used to instruct the central processing unit 1058 to perform the operations associated with various automated processes of the present invention. Other examples of suitable computer readable media for storing information include magnetic, electronic, or optical (including holographic) storage, some combination thereof, etc.

In general, it should be emphasized that the various components of embodiments of the present invention can be implemented in hardware, software or a combination thereof. In such embodiments, the various components and steps would be implemented in hardware and/or software to perform the functions of embodiments of the present invention. Any presently available or future developed computer software language and/or hardware components can be employed in such embodiments of the present invention. For example, at least some of the functionality mentioned above could be implemented using Visual Basic, C, C++, or any computer language appropriate in view of the processor(s) being used. It could also be written in an interpretive environment such as Java and transported to multiple destinations to various users.

The many features and advantages of embodiments of the present invention are apparent from the detailed specification, and thus, it is intended by the appended claims to cover all such features and advantages of the invention, which fall within the true spirit, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of controlling a semiconductor manufacturing tool using a feedback control mechanism, comprising:
   (a) receiving a plurality of data points relating to an output of the tool including a current data point and at least one previous data point;
   (b) determining whether the current data point is an outlier based on:
      (b-1) comparing the current data point to a statistical representation of the at least one previous data point; and
      (b-2) whether the at least one previous data point is an outlier; and
   (c) disregarding the current data point in calculating a feedback value of the feedback control mechanism if the current data point is determined as an outlier.

2. The method of claim 1, wherein (b) further comprises:
   determining the current data point as an outlier only if the at least one previous data point is not an outlier.

3. The method of claim 1 or 2, further comprising:
   (d) calculating the feedback value of the feedback control mechanism using the current data point and the at least one previous data point if the current data point is determined as not an outlier.

4. The method of claim 1 or 2, further comprising:
   (d) calculating a previous feedback value for the at least one previous data point and then calculating the feedback value based on the previous feedback value and the current data point if the at least one previous data point is an outlier and the current data point is an outlier.

5. The method of claim 1 or 2, wherein the statistical representation of (b-1) is a weighted moving average of the at least one previous data point.

6. The method of claim 1 or 2, wherein the statistical representation of (b-1) is an exponentially-weighted moving average of the at least one previous data point.

7. The method of claim 1 or 2, wherein the statistical representation of (b-1) is expressed as:

$$S_k = \beta(F_k - \Delta_k)^2 + (1-\beta)S_{k-1}$$

where, $\beta$ is a coefficient;

$F_k$ is the difference between the current data point and predicted values for wafer k; and $\Delta_k$ is a feedback value for time k.

8. The method of claim 7, wherein the value of $\Delta_k$ is calculated as:

if $|F_k - \Delta_k| \leq K_n s_k$ $$\Delta_{k+1} = \lambda_k F_k + (1-\lambda_k)\Delta_k$$

else $$\Delta_{k+1} = \Delta_k$$

where, $\lambda_k$ is a coefficient;

$K_n$ is an outlier coefficient; and $s_k = \sqrt{S_k}$.

9. The method of claim 7, further comprising:
   updating $S_k$ as $S_k = \beta(F_k - \Delta_k)^2 + (1-\beta)S_{k-1}$ when the current data point is determined as not an outlier.

10. The method of claim 7, further comprising:
    updating $S_k$ as $S_k = S_{k-1}$ when the current data point is determined as an outlier.

11. The method of claim 6, further comprising:
    updating $S_k$ as $S_{k-1} = \beta(F_{k-1} - \Delta_{k-1})^2 + (1-\beta)S_{k-1}$; and then
    updating $S_k$ as $S_k = \beta(F_k - \Delta_k)^2 + (1-\beta)S_{k-}$, when the current data point is determined as not an outlier and the previous data was not determined as an outliner.

12. The method of claim 1 or 2, further comprising:
    making a plurality of measurements on the output of the tool using at least one metrology station; and
    calculating the current data point based on the plurality of measurements.

13. The method of claim 12, further comprising:
   calculating an interval based on statistical information relating to the plurality of measurements;
   identifying a subset among the plurality of measurements that fall within the interval; and
   calculating the current data point from the subset of the plurality of the measurements.

14. The method of claim 13, wherein the statistical information relates to at least one of a median and a standard deviation of the plurality of measurements.

15. The method of claim 14, further comprising:
   calculating the standard deviation based on one of a variance and a scaled variance of the plurality of measurements.

16. A system of controlling a semiconductor manufacturing tool using a feedback control mechanism, comprising:
   an estimator configured to receive a plurality of data points relating to an output of the tool including a current data point and at least one previous data point,
   wherein the estimator is further configured to determine whether the current data point is an outlier based on comparing the current data point to a statistical representation of the at least one previous data point, and whether the at least one previous data point is an outlier, and
   wherein the estimator is further configured to disregard the current data point in calculating a feedback value of the feedback control mechanism if the current data point is determined as an outlier.

17. The system of claim 16, wherein the estimator is further configure to determine the current data point as an outlier only if the at least one previous data point is an outlier.

18. The system of claim 16, wherein the estimator is further configured to calculate the feedback value of the feedback control mechanism using the current data point and the at least one previous data point if the current data point is determined as not an outlier.

19. The system of claim 16, wherein the estimator is further configured to calculate a previous feedback value for the at least one previous data point and then calculate the feedback value based on the previous feedback value and the current data point if the at least one previous data point is an outlier and the current data point is an outlier.

20. The system of claim 16, wherein the statistical representation of is a weighted moving average of the at least one previous data point.

21. The system of claim 16, wherein the statistical representation of is an exponentially-weighted moving average of the at least one previous data point.

22. The system of claim 16, wherein the statistical representation of is expressed as:

$$S_k = \beta(F_k - \Delta_k)^2 + (1-\beta)S_{k-1}$$

where,
   $\beta$ is a coefficient;
   $F_k$ is the difference between the current data point and predicted values for wafer k; and
   $\Delta_k$ is a feedback value for time k.

23. The system of claim 22, wherein the value of $\Delta_k$ is calculated as:

if $|F_k - \Delta_k| \leq K_n s_k$ $\Delta_{k+1} = \lambda F_k + (1-\lambda_k)\Delta_k$ else $\Delta_{k+1} = \Delta_k$ where, $\lambda_k$ is a coefficient;
   $K_n$ is an outlier coefficient; and
   $s_k = \sqrt{S_k}$.

24. The system of claim 22, wherein the estimator is further configured to update $S_k$ as $S_k = \beta(F_k - \Delta_k)^2 + (1-\beta)S_{k-1}$ when the current data point is determined as not an outlier.

25. The system of claim 22, wherein the estimator is further configured to update $S_k$ as $S_k = S_{k-1}$ when the current data point is determined as an outlier.

26. The system of claim 22, wherein the estimator is further configured to update
   $S_k$ as $S_{k-1} = \beta(F_{k-1} - \Delta_{k-1})^2 + (1-\beta)S_{k-1}$; and
   $S_k$ as $S_k = \beta(F_k - \Delta_k)^2 + (1-\beta)S_{k-1}$, when the current data point is determined as not an outlier and the previous data was not determined as an outliner.

27. The system of claim 16, further comprising:
   at least one metrology station configured to make a plurality of measurements on the output of the tool, wherein the estimator is further configured to calculate the current data point based on the plurality of measurements.

28. The system of claim 27, the estimator is further configured to calculate an interval based on statistical information relating to the plurality of measurements, configured to identify a subset among the plurality of measurements that fall within the interval, and configured to calculate the current data point from the subset of the plurality of the measurements.

29. The system of claim 28, wherein the statistical information relates to at least one of a median and a standard deviation of the plurality of measurements.

30. The system of claim 29, the estimator is further configured to calculate the standard deviation based on one of a variance and a scaled variance of the plurality of measurements.

31. A system of controlling a semiconductor manufacturing tool using a feedback control mechanism, comprising:
   (a) means for receiving a plurality of data points relating to an output of the tool including a current data point and at least one previous data point, where in the at least one previous data point is received before the current data point;
   (b) means for determining whether the current data point is an outlier based on:
      (b-1) comparing the current data point to a statistical representation of the at least one previous data point; and
      (b-2) whether the at least one previous data point is an outlier; and
   (c) means for disregarding the current data point in calculating a feedback value of the feedback control mechanism if the current data point is determined as an outlier.

32. The method of claim 31, further comprising:
   means for determining the current data point as an outlier only if the at least one previous data point is an outlier.

33. The system of claim 31, further comprising:
   (d) means for calculating the feedback value of the feedback control mechanism using the current data point and the at least one previous data point if the current data point is determined as not an outlier.

34. The system of claim 31, further comprising:
(d) means for calculating a previous feedback value for the at least one previous data point and then calculating the feedback value based on the previous feedback value and the current data point if the at least one previous data point is an outlier and the current data point is an outlier.

35. The system of claim 31, wherein the statistical representation of is a weighted moving average of the at least one previous data point.

36. The system of claim 31, wherein the statistical representation of is an exponentially-weighted moving average of the at least one previous data point.

37. The system of claim 31, wherein the statistical representation of is expressed as:

$$S_k = \beta(F_k - \Delta_k)^2 + (1-\beta)S_{k-1}$$

where, $\beta$ is a coefficient;

$F_k$ is the difference between the current data point and predicted values for wafer k; and $\Delta_k$ is a feedback value for time k.

38. The system of claim 37, wherein the value of $\Delta_k$ is calculated as:

if $|F_k - \Delta_k| \leq K_n s_k$ $$\Delta_{k+1} = \lambda_k F_k + (1-\lambda_k)\Delta_k$$

else $$\Delta_{k+1} = \Delta_k$$

where, $\lambda_k$ is a coefficient;

$K_n$ is an outlier coefficient; and $s_k = \sqrt{S_k}$.

39. The system of claim 37, further comprising:
means for updating $S_k$ as $S_k = \beta(F_k - \Delta_k)^2 + (1-\beta)S_{k-}$ when the current data point is determined as not an outlier.

40. The system of claim 37, further comprising:
means for updating $S_k$ as $S_k = S_{k-1}$ when the current data point is determined as an outlier.

41. The system of claim 37, further comprising:
means for updating $S_k$ as $S_{k-1} = \beta(F_{k-1} - \Delta_{k-1})^2 + (1-\beta)S_{k-1}$; and then
means for updating $S_k$ as $S_k = \beta(F_k - \Delta_k)^2 + (1-\beta)S_{k-1}$, when the current data point is determined as not an outlier and the previous data was not determined as an outliner.

42. The system of claim 31, further comprising:
means for making a plurality of measurements on the output of the tool using at least one metrology station; and
means for calculating the current data point based on the plurality of measurements.

43. The system of claim 42, further comprising:
means for calculating an interval based on statistical information relating to the plurality of measurements;
means for identifying a subset among the plurality of measurements that fall within the interval; and
means for calculating the current data point from the subset of the plurality of the measurements.

44. The system of claim 43, wherein the statistical information relates to at least one of a median and a standard deviation of the plurality of measurements.

45. The system of claim 44, further comprising:
means for calculating the standard deviation based on one of a variance and a scaled variance of the plurality of measurements.

46. A computer readable medium for storing instructions being executed by one or more computers, the instructions directing the one or more computers for controlling a semiconductor manufacturing tool using a feedback control mechanism, the instructions comprising implementation of the steps of:
(a) receiving a plurality of data points relating to an output of the tool including a current data point and at least one previous data point;
(b) determining whether the current data point is an outlier based on:
(b-1) comparing the current data point to a statistical representation of the at least one previous data point; and
(b-2) whether the at least one previous data point is an outlier; and
(c) disregarding the current data point in calculating a feedback value of the feedback control mechanism if the current data point is determined as an outlier.

47. The method of claim 46, further comprising:
determining the current data point as an outlier only if the at least one previous data point is an outlier.

48. The medium of claim 46, further comprising:
(d) calculating the feedback value of the feedback control mechanism using the current data point and the at least one previous data point if the current data point is determined as not an outlier.

49. The medium of claim 46, further comprising:
(d) calculating a previous feedback value for the at least one previous data point and then calculating the feedback value based on the previous feedback value and the current data point if the at least one previous data point is an outlier and the current data point is an outlier.

50. The medium of claim 46, wherein the statistical representation of (b-1) is a weighted moving average of the at least one previous data point.

51. The medium of claim 46, wherein the statistical representation of (b-1) is an exponentially-weighted moving average of the at least one previous data point.

52. The medium of claim 46, wherein the statistical representation of (b-1) is expressed as:

$$S_k = \beta(F_k - \Delta_k)^2 + (1-\beta)S_{k-1}$$

where, $\beta$ is a coefficient;

$F_k$ is the difference between the current data point and predicted values for wafer k; and $\Delta_k$ is a feedback value for time k.

53. The medium of claim 52, wherein the value of $\Delta_k$ is calculated as:

if $|F_k - \Delta_k| \leq K_n s_k$ $$\Delta_{k+1} = \lambda_k F_k + (1-\lambda_k)\Delta_k$$

else $$\Delta_{k+1} = \Delta_k$$

where, $\lambda_k$ is a coefficient;

$K_n$ is an outlier coefficient; and $S_k=\sqrt{S_k}$.

54. The medium of claim 52, further comprising:

updating $S_k$ as $S_k=\beta(F_k-\Delta_k)^2+(1-\beta)S_{k-1}$ when the current data point is determined as not an outlier.

55. The medium of claim 52, further comprising:

updating $S_k$ as $S_k=S_{k-1}$ when the current data point is determined as an outlier.

56. The medium of claim 52, further comprising:

updating $S_k$ as $S_{k-1}=\beta(F_{k-1}-\Delta_{k-1})^2+(1-\beta)S_{k-1}$; and then updating $S_k$ as $S_k=\beta(F_k-\Delta_k)^2+(1-\beta)S_{k-1}$, when the current data point is determined as not an outlier and the previous data was not determined as an outliner.

57. The medium of claim 46, further comprising:

making a plurality of measurements on the output of the tool using at least one metrology station; and calculating the current data point based on the plurality of measurements.

58. The medium of claim 57, further comprising:

calculating an interval based on statistical information relating to the plurality of measurements;

identifying a subset among the plurality of measurements that fall within the interval; and calculating the current data point from the subset of the plurality of the measurements.

59. The medium of claim 58, wherein the statistical information relates to at least one of a median and a standard deviation of the plurality of measurements.

60. The medium of claim 59, further comprising:

calculating the standard deviation based on one of a variance and a scaled variance of the plurality of measurements.

61. A system of manufacturing semiconductor devices using a feedback control mechanism, comprising:

at least one processing tool configured to perform at least one semiconductor fabrication step on at least one wafer;

at least one metrology station coupled to the at least one processing tool and configured to make measurements on the at least one wafer;

an estimator configured to receive a plurality of data points relating to an output of the at least one tool including a current data point and at least one previous data point calculated base on the measurements made by the at least one metrology station, wherein the estimator is further configured to determine whether the current data point is an outlier based on comparing the current data point to a statistical representation of the at least one previous data point, and whether the at least one previous data point is an outlier, and wherein the estimator is further configured to disregard the current data point in calculating a feedback value of the feedback control mechanism if the current data point is determined as an outlier.

62. The system of claim 61, wherein the estimator is further configure to determine the current data point as an outlier only if the at least one previous data point is an outlier.

63. The system of claim 61, further comprising:

an optimizer coupled to the estimator to receive the feedback value and configured to generate at least one control parameter for operating the at least one tool based on the feedback value.

64. The system of claim 61, wherein the at least one tool is an etcher.

65. A method of controlling a semiconductor manufacturing tool using a feedback control mechanism, comprising:

(a) receiving a plurality of data points relating to an output of the tool including a current data point, a subsequent data point, and at least one previous data point;

(b) determining the current data point as an erroneous outlier:

(b-1) if a difference between the current data point and a predicted value, which is calculated from a statistical representation of the at least one previous data point, is outside of a threshold;

(b-2) if the at least one previous data point is not an outlier; and (b-3) if the subsequent data point is not an outlier; and (c) disregarding the current data point in calculating a feedback value of the feedback control mechanism if the current data point is determined as an erroneous outlier.

66. The method of claim 65, wherein the statistical representation of (b-1) is an exponentially-weighted moving average of the at least one previous data point.

67. The method of claim 66, wherein the statistical representation of (b-1) is expressed as:

$$S_k=\beta(F_k-\Delta_k)^2+(1-\beta)S_{k-1}$$

where, $\beta$ is a coefficient;

$F_k$ is the difference between the current data point and predicted values for wafer k; and $\Delta_k$ is a feedback value for time k.

68. The method of claim 67, wherein the threshold is calculated as:

$$|F_k-\Delta_k|\leq K_n s_k$$

where, $\lambda_k$ is a coefficient;

$K_n$ is an outlier coefficient; and $s_k=\sqrt{S_k}$.

* * * * *